United States Patent
Ramia et al.

(10) Patent No.: US 9,882,814 B2
(45) Date of Patent: Jan. 30, 2018

(54) TECHNOLOGIES FOR BRIDGING BETWEEN COARSE-GRAINED AND FINE-GRAINED LOAD BALANCING

(71) Applicant: Intel Corporation, Santa Clara, CA (US)

(72) Inventors: Kannan Babu Ramia, Chandler, AZ (US); Christian Maciocco, Portland, OR (US); Sameh Gobriel, Hillsboro, OR (US); Ashok Sunder Rajan, Burnaby (CA)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 14/496,495

(22) Filed: Sep. 25, 2014

(65) Prior Publication Data
US 2016/0094449 A1    Mar. 31, 2016

(51) Int. Cl.
*H04L 12/28*    (2006.01)
*H04L 12/56*    (2006.01)
(Continued)

(52) U.S. Cl.
CPC ............ *H04L 47/125* (2013.01); *H04L 45/02* (2013.01); *H04L 45/021* (2013.01); *H04L 45/04* (2013.01);
(Continued)

(58) Field of Classification Search
CPC ... H04L 47/125; H04L 45/021; H04L 45/745; H04L 47/17; H04L 45/04; H04L 45/64; H04L 45/02
(Continued)

(56) References Cited

U.S. PATENT DOCUMENTS

| 2013/0070762 A1 | 3/2013 | Adams |
| 2013/0223443 A1 | 8/2013 | Ziegler |

(Continued)

FOREIGN PATENT DOCUMENTS

| JP | 2011-170718 A | 9/2011 |
| KR | 10-2014-0060583 | 5/2014 |

OTHER PUBLICATIONS

European Search Report for Application No. 15181766.5-1857, dated Feb. 18, 2016, 8 pages.
(Continued)

*Primary Examiner* — Chuong T Ho
(74) *Attorney, Agent, or Firm* — Barnes & Thornburg LLP

(57) ABSTRACT

Technologies for bridging between coarse-grained and fine-grained load balancing include a computing node of a cluster computing device and a network controller. The computing node may add a flow entry to a local flow table based on flow information received from the network controller. The computing node may transmit a multicast network packet including the flow information and next hop information to other computing nodes of the cluster device. The computing node may also add a different flow entry to the local flow table and a next hop entry to a local next hop table based on a multicast network packet received from another computing node of the cluster device. The computing node may locally process a network packet received from a remote computing device or forward the received network packet to another computing node of the cluster device based on the flow entries added to the local flow table.

25 Claims, 11 Drawing Sheets

(51) Int. Cl.
*H04L 12/803* (2013.01)
*H04L 12/715* (2013.01)
*H04L 12/751* (2013.01)
*H04L 12/755* (2013.01)
*H04L 12/741* (2013.01)
*H04L 12/801* (2013.01)

(52) U.S. Cl.
CPC ............ *H04L 45/64* (2013.01); *H04L 45/745* (2013.01); *H04L 47/17* (2013.01)

(58) Field of Classification Search
USPC ....... 370/248, 254, 392, 401, 252, 253, 390, 370/249
See application file for complete search history.

(56) References Cited

U.S. PATENT DOCUMENTS

| | | | |
|---|---|---|---|
| 2013/0223444 A1 | 8/2013 | Liljenstolpe et al. | |
| 2014/0241353 A1* | 8/2014 | Zhang | H04L 45/74 370/390 |
| 2015/0002616 A1* | 1/2015 | Yoon | H04L 41/0806 348/14.09 |
| 2015/0249572 A1* | 9/2015 | Mack-Crane | H04L 45/38 709/222 |
| 2015/0256465 A1* | 9/2015 | Mack-Crane | H04L 41/12 709/232 |
| 2015/0281036 A1* | 10/2015 | Sun | H04L 43/0829 370/248 |
| 2015/0319088 A1* | 11/2015 | Wenig | H04L 45/745 370/392 |

OTHER PUBLICATIONS

Amer, Fathy et al., "Performance Evaluation of a Hierachical Hybrid Adaptive Routing Algorithm for Large Scale Computer Communication Networks," Proceedings of the Computer Networking Symposium. Washing, Apr. 11-13, 1988IEEE Comp. Soc. Press, US, Apr. 11, 1988, pp. 266-275.

Notice of Reasons for Rejection and English Translation for Japanese Application No. 2015-159579, dated Sep. 7, 2016, 8 pages.

Office Action in Korean Patent Application No. 2015-0118720, dated Jul. 19, 2017 (9 pages, including English translation).

* cited by examiner

```
500 sesssion_add(flow_tuple, flow_id)
    {
        ret = flow_entry_add ( flow_tuple, flow_id, nhop_idx, nhop_type)
            {
                if (nhop_type == NHOP_LOCAL)
                    {
                        flow_add(flow_tuple, flow_id, nhop_idx, nhop_type);
                    }
                else
                    {
                        // handle other nhop_type events
                    }
            }

If (ret == TRUE)
            {
                session_broadcast(flow_tuple, flow_id)
                    {
                        nhop_ip = get_interface_ip();
                        mcast_ip = get_mcast_ip(session_group_id);
                        mpkt = form_mcast_pkt(flow_tuple, flow_id, nhop_ip);
                        send_pkt(mpkt);
                    }
            }
    }
```

FIG. 5

```
receive_pkt(mpkt)
    {
        If (mpkt.type == session_bcast)
            {
                extract_info(mpkt, &flow_tuple, &flow_id, &nhop_ip) ;
                ret = flow_entry_add ( flow tuple, flow_id, nhop_idx, nhop_type)
                    {
                        If (nhop_type == NHOP_LOCAL)
                            {
                                //primary instance
                            }
                        else
                            {
                                nhop_idx = nhop_add(nhop_ip) ;
                                flow_add(flow_tuple,flow_id, nhop_idx, nhop_type);
                            }
                    }
            }
    }
```

FIG. 7

```
flow_lkup (flow_tuple, &nhop_type, & nhop_idx);
if(nhop_type == NHOP_LOCAL)
    {
        /* hand it over to application */
        enque_lb_ring(mpkt);
    }
else
    {
        if(nhop_type == NHOP_REMOTE)
            {
                /* hand it over to primary instance */
                ret = nhop_lkup(nhop_idx, &dst_mac);
                mpkt->dst_mac = dst_mac;
                enqueue_tx_ring(mpkt);
            }
    }
```

TECHNOLOGIES FOR BRIDGING BETWEEN COARSE-GRAINED AND FINE-GRAINED LOAD BALANCING

BACKGROUND

A cluster system or a cluster device is a group of interconnected computing nodes (e.g., off-the-shelf servers, desktop computers, etc.) configured to operate together to process network traffic received from remote computing devices. Oftentimes, the processing of incoming network traffic may be distributed between the computing nodes of the cluster system according to a fine-grained load balancing scheme. However, from the perspective of computing devices external to the cluster system, the group of interconnected computing nodes appears as a single logical entity with multiple interfaces. In some environments, a network load balancer is used to distribute incoming network traffic between the interfaces of the single logical entity.

Network load balancers distribute network traffic between two or more computing devices to, among other things, balance processing workloads, provide redundancy, provide scalability, and increase availability. To do so, network load balancers typically distribute incoming network packets between computing devices according to a coarse-grained load balancing scheme (e.g., equal-cost multi-path routing (ECMP), round-robin, etc.). Such network load balancers, however, are unaware of the physical topologies of typical cluster systems and, as a result do not understand the fine-grained load balancing schemes utilized in those systems.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is an illustrative embodiment of pseudocode that may be executed by a computing node of the cluster computing device of the system of FIG. 1 to perform the method of FIG. 4;

FIG. 7 is an illustrative embodiment of pseudocode that may be executed by a computing node of the cluster computing device of the system of FIG. 1 to perform the method of FIG. 6;

FIG. 10 is an illustrative embodiment of pseudocode that may be executed by a computing node of the cluster computing device of the system of FIG. 1 to perform the method of FIGS. 8 and 9.

DETAILED DESCRIPTION OF THE DRAWINGS

Figure 1:
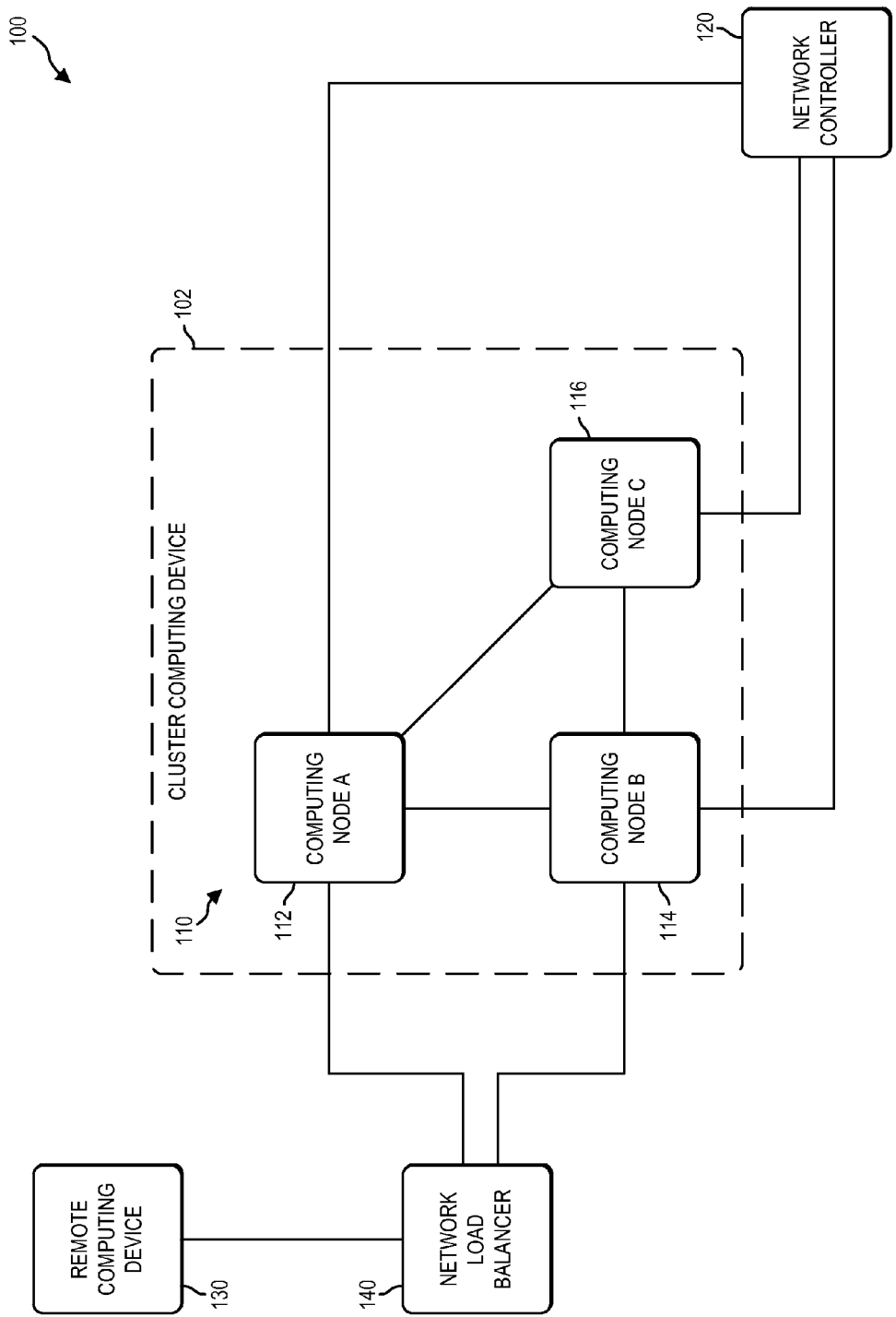
FIG. 1 is a simplified block diagram of at least one embodiment of a system for bridging between coarse-grained and fine-grained load balancing on a cluster computing device including a number of computing nodes.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

Referring now to FIG. 1, in an illustrative embodiment a system 100 for bridging between coarse-grained and fine-grained load balancing includes a cluster computing device 102 having a plurality of computing nodes 110, a network controller 120, a remote computing device 130, and a network load balancer 140, each of which may be capable of operating in a software-defined networking (SDN) environment and/or a network functions virtualization (NFV) environment. The network load balancer 140 may be communicatively coupled to two or more computing nodes 110 (e.g., the computing node A 112 and the computing node B 114) of the cluster computing device 102 via separate communication links (e.g., point-to-point links, bus links, wires, cables, light guides, etc.). In use, the network load balancer 140 receives network packets destined for the cluster computing device 102 from one or more computing devices such as, for example, the remote computing device 130. The network load balancer 140 may distribute the received network packets across the plurality of computing nodes 110 of the cluster computing device 102 according to a coarse-grained load balancing scheme (e.g., equal-cost multi-path routing (ECMP), round-robin, etc.). However, responsibility for processing the received network packets (e.g., performing packet forwarding operations, performing packet routing operations, performing local packet processing operations, etc.) may be divided up among the plurality of computing nodes 110 according to a fine-grained load balancing scheme.

Therefore, in some embodiments, a received network packet may be forwarded by the network load balancer 140 to any one of the computing nodes 110 (e.g., the computing node A 112, the computing node B 114, the computing node C 116) of the cluster computing device 102 regardless of the particular computing node 110 responsible for processing the network packet. In such embodiments, each of the computing nodes 110 of the cluster computing device 102 may be configured to determine whether it is the computing node 110 responsible for processing the received network packet or whether another computing node 110 of the cluster computing device 102 is responsible. Such determination may be made based on network flow information received from the network controller 120 or another one of the computing nodes 110 of the cluster computing device 102. In some embodiments, such determination may also be made based on combined information received from the network controller 120 and any number of other computing devices, computing nodes, and/or computing entities. For example, in such embodiments, each of computing node 110 of the cluster computing device 102 may be configured to determine whether it or a different computing node 110 is responsible for processing a particular network packet based on network flow information received from the network controller 120 in combination with information received from another one of the computing nodes 110 and/or computing entities (e.g., a workload control entity, etc.) of the cluster computing device 102.

If the computing node 110 that receives the network packet from the network load balancer 140 is the computing node 110 responsible for processing the network packet, the network packet will be locally processed further. If, however, the computing node 110 that receives the network packet from the network load balancer 140 is not the computing node 110 responsible for processing the network packet, the computing node 110 determines which of the other computing nodes 110 of the cluster computing device 102 is responsible for processing the network packet. The received network packet is then forwarded to the responsible computing node 110 of the cluster computing device 102 for further processing.

In operation, a computing node 110 (e.g., the computing node A 112) may receive a network packet forwarded by the network load balancer 140 based on a coarse-grained load balancing scheme. The computing node 110 (e.g., the computing node A 112) may determine whether it is the computing node 110 of the cluster computing device 102 responsible for processing the network packet. To do so, in some embodiments, the computing node 110 (e.g., the computing node A 112) may compare source and destination information (e.g., a 5-tuple) of the received network packet to a local flow table maintained by the computing node 110 (e.g., the computing node A 112). In some embodiments, the computing node 110 (e.g., the computing node A 112) may compare all of the source and destination information associated with the received network packet (e.g., all of the fields of the 5-tuple) or it may compare a subset of the source and destination information associated with the received network packet (e.g., a portion of the fields of the 5-tuple). In such embodiments, the particular source and destination information (e.g., which fields of the 5-tuple) compared by the computing node 110 (e.g., the computing node A 112) may be selected or otherwise determined by the network controller 120 and/or a different computing node or entity of the cluster computing device 102 (e.g., another one of the computing nodes 110, a workload control entity, etc.). Regardless, the computing node 110 (e.g., the computing node A 112) determines whether the source and destination information of the received network packet matches a network flow entry of a plurality of network flow entries included in the local flow table maintained by the computing node 110 (e.g., the computing node A 112). In response to determining that the source and destination information of the received network packet matches a network flow entry in the local flow table, the computing node 110 (e.g., the computing node A 112) determines a next hop type associated with the matching network flow entry. If the computing node 110 (e.g., the computing node A 112) determines that the next hop type of the matching network flow entry indicates that the next hop (e.g., a next hop computing device) is local, the computing node 110 (e.g., the computing node A 112) locally processes the received network packet, If, however, the computing node 110 (e.g., the computing node A 112) determines instead that the next hop type of the matching network flow entry indicates that the next hop is remote, the computing node 110 (e.g., the computing node A 112) forwards the received network packet to the responsible computing node 110 of the cluster computing device 102 for further processing based on an associated next hop entry stored in a local next hop table maintained by the computing node 110 (e.g., the computing node A 112).

In some embodiments, the computing node 110 (e.g., the computing node A 112) receives network flow information from the network controller 120. The network flow information corresponds to a network flow and any network packets associated with that network flow. In such embodiments, the computing node 110 (e.g., the computing node A 112) adds a network flow entry to its local flow table. In doing so, the computing node 110 (e.g., the computing node A 112) updates a next hop type of the added network flow entry to indicate that received network packets matching the network flow entry are to be processed locally. Subsequently, the computing node 110 (e.g., the computing node A 112) generates and transmits a multicast network packet to the other computing nodes 110 of the cluster computing device 102. The multicast network packet generated by the computing node 110 (e.g., the computing node A 112) includes the network flow information received from the network controller 120 and an internet protocol (IP) address associated with the computing node 110 (e.g., the computing node A 112). In some embodiments, the other computing nodes 110 add a corresponding network flow entry to their local flow tables and an associated next hop entry to their local next hop tables based on the multicast network packet received from the computing node 110 (e.g., the computing node A 112). In such embodiments, however, the local network flow entry added by the other computing nodes 110 to their respective local flow tables include a next hop type to indicate that received network packets matching the network flow entry are to be processed remotely (e.g., by the computing node A 112).

In some embodiments, the computing node 110 (e.g., the computing node A 112) also receives a multicast network packet generated and transmitted by another one of the computing nodes 110 (e.g., the computing node B 114) of the cluster computing device 102. The received multicast network packet may include network flow information corresponding to a network flow and any network packets associated with that network flow. In some embodiments, the received multicast network packet also includes next hop information indicative of the computing node 110 (e.g., the computing node B 114) responsible for processing network packets associated with the network flow corresponding to the included network flow information. In such embodiments, the computing node 110 (e.g., the computing node A 112) may add a new network flow entry to its local flow table and an associated next hop entry to its local next hop table based on the network flow information and the next hop information of the received multicast network packet. In doing so, the computing node 110 (e.g., the computing node A 112) updates a next hop type of the added network flow entry to indicate that any received network packets matching the network flow entry are to be forwarded to the other computing node 110 (e.g., the computing node B 114) to be processed remotely.

The cluster computing device 102 (e.g., distributed computing device) may be embodied as a group of individual computing nodes 110 acting in concert to perform the functions described herein. As illustratively shown in FIG. 1, the cluster computing device 102 may include multiple computing nodes 110 communicatively coupled to each other according to a fully connected mesh networking topology. It should be appreciated, however, that each computing node 110 may be communicatively coupled to the other computing nodes 110 according to any other networking topology. For example, each computing node 110 may be communicatively coupled to the other computing nodes 110 according to, among others, a switched network topology, a Clos network topology, a bus network topology, a star network topology, a ring network topology, and/or any combination thereof. Each of the computing nodes 110 of the cluster computing device 102 may be configured to perform any portion of the packet processing operations (e.g., packet forwarding operations, packet routing operations, local packet processing operations, etc.) for the cluster computing device 102. For example, each of the computing nodes 110 may be configured to locally process network packets associated with a particular network flow based at least in part on, or otherwise as a function of, network flow information received from the network controller 120. Additionally or alternatively, each of the computing nodes 110 may be configured to forward or route network packets associated with a particular network flow to another computing node 110 of the cluster computing device 102 for further processing based at least in part on, or otherwise as a function of, network flow information and next hop information received from the other computing node 110 via a multicast network packet.

Figure 2:
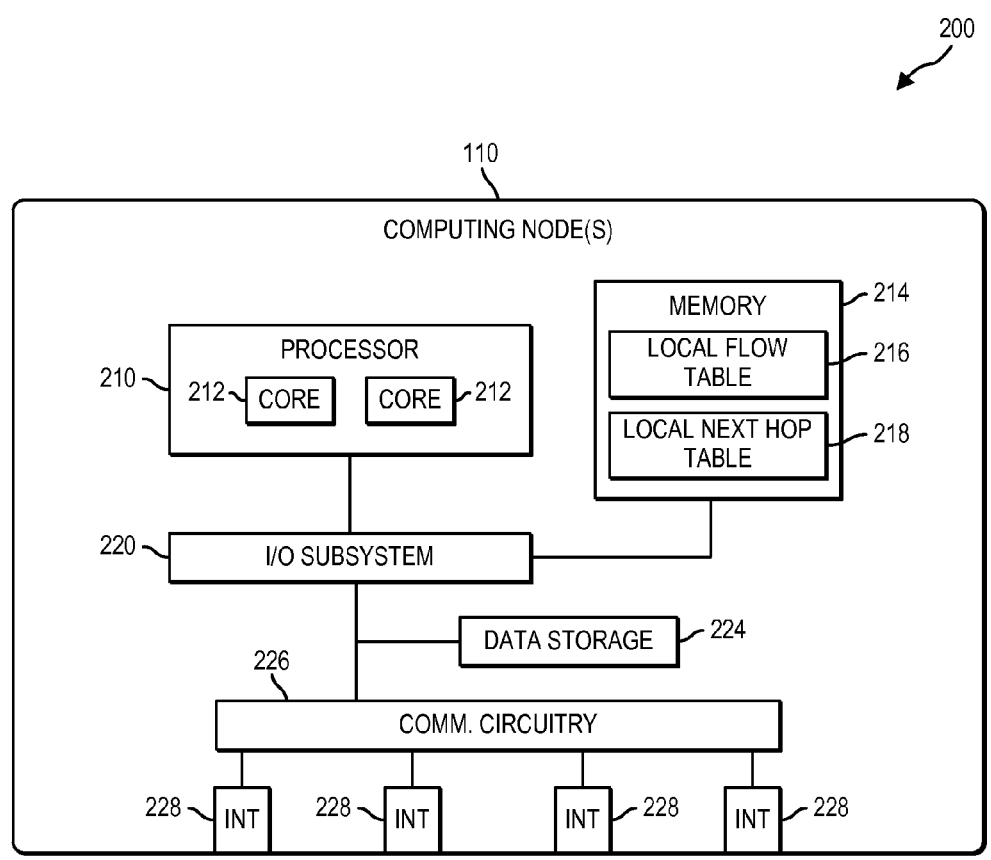
FIG. 2 is a simplified block diagram of at least one embodiment of the computing nodes of the cluster computing device of the system of FIG. 1.

Referring now to FIG. 2, each of the computing nodes 110 may be embodied as, or otherwise include, any type of computing device capable of performing the functions described herein including, but not limited to a server computer, a desktop computer, a laptop computing device, a consumer electronic device, a mobile computing device, a mobile phone, a smart phone, a tablet computing device, a personal digital assistant, a wearable computing device, a smart television, a smart appliance, and/or other type of computing device. As illustratively shown in FIG. 2, each of the computing nodes 110 includes a processor 210, a memory 214, an input/output (I/O) subsystem 220, a data storage 224, and communication circuitry 226. Of course, the computing nodes 110 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 214, or portions thereof, may be incorporated in the processor 210 in some embodiments. It should be understood that although each of computing nodes 110 includes the processor 210, memory 214, input/output (I/O) subsystem 220, data storage 224, and communication circuitry 226, the following discussion of those illustrative components is described with specific reference to a single computing node 112 for clarity of the description.

The processor 210 may be embodied as any type of processor capable of performing the functions described herein. For example, in some embodiments, the processor 210 may be embodied as a single core processor, digital signal processor, microcontroller, or other processor or processing/controlling circuit. In other embodiments, such as the one illustratively shown in FIG. 2, the processor 210 may be embodied as a multi-core processor having multiple processor cores 212. In such embodiments, each processor core 212 of the processor 210 is capable of executing one or more applications.

The memory 214 may be embodied as any type of volatile or non-volatile memory or data storage capable of performing the functions described herein. In operation, the memory 214 may store various data and software used during operation of the computing node 112 such as operating systems, applications, programs, libraries, and drivers. The memory 214 is communicatively coupled to the processor 210 via the I/O subsystem 220, which may be embodied as circuitry and/or components to facilitate input/output operations with the processor 210, the memory 214, and other components of the computing node 112. For example, the I/O subsystem 220 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 220 may form a portion of a system-on-a-chip (SoC) and be incorporated, along with the processor 210, the memory 214, and other components of the computing node 112, on a single integrated circuit chip.

In some embodiments, the memory 214 includes a local flow table 216. As discussed in more detail below, the local flow table 216 includes a plurality of network flow entries, each having information that corresponds to a different network flow. For example, each network flow entry of the local flow table 216 may be associated with a different network flow and may include a flow identifier, a flow tuple, a next hop type, and a next hop index corresponding to that network flow. The flow identifier of each network flow entry uniquely identifies the network flow entry from the other network flow entries of the plurality of network flow entries stored in the local flow table 216 of the computing node 112. The flow tuple of each network flow entry may indicate a source and a destination of network packets associated with the corresponding network flow. For example, in some embodiments, the flow tuple may include, among other types of information, a source internet protocol (IP) address, a source port number, a destination IP address, a destination port number, and a protocol of network packets associated with the corresponding network flow.

The next hop type of each network flow entry indicates whether network packets associated with the corresponding network flow are to be processed locally by the computing node 112 or remotely by another one of the computing nodes 110 of the cluster computing device 102. The next hop index of each network flow entry indicates or otherwise identifies the particular next hop entry of a local next hop table 218 of the computing node 112 associated with that network flow entry. As discussed below, the next hop index uniquely identifies the associated next hop entry from a plurality of next hop entries stored in the local next hop table 218 of the computing node 112. Additionally, as discussed below, the next hop index of one or more network flow entries of the local flow table 216 may include a null value in embodiments in which the next hop type of the corresponding network flow entry indicates that the network packets associated with the corresponding network flow are to be processed locally by the computing node 112. In such embodiments, the local next hop table 218 may not include an associated next hop entry. Additionally, in some embodiments, one or more of the flow entries stored in the local flow table 216 may correspond to a network flow in which network packets have already been received by the computing node 112. Additionally or alternatively, one or more of the flow entries stored in the local flow table 216 may correspond to a network flow in which network packets have not yet been received by the computing node 112. That is, in some embodiments, one or more of the flow entries stored in the local flow table 216 may correspond to a network flow in which network packets may be received at a later time.

In some embodiments, the memory 214 also includes the local next hop table 218. As discussed in more detail below, the local next hop table 218 includes a plurality of next hop entries, each being associated with a different network flow entry of the local flow table 216 and including information for determining or otherwise identifying a next hop computing node 110 (e.g., another one of the computing nodes 110 of the cluster computing device 102) responsible for further processing received network packets. For example, each next hop entry of the local next hop table 218 may be associated with a different network flow entry of the local flow table 216 and may include a flow identifier, an IP address associated with the next hop computing node 110 responsible for further processing received network packets corresponding to a network flow, and a media access control (MAC) address associated with the next hop computing node 110 responsible for further processing the received network packets corresponding to the network flow. The next hop index of each next hop entry uniquely identifies the next hop entry from the other next hop entries of the plurality of next hop entries stored in the local next hop table 218 of the computing node 112.

In some embodiments, the network flow information (e.g., the flow tuple, next hop type, next hop index, and next hop identifier of each network flow entry) and the next hop information (e.g., the flow identifier, IP address of the next hop computing node 110, and MAC address of the next hop computing node 110 of each next hop entry) for a particular network flow may be stored or maintained in the same table rather than in separate tables. Of course, it should be appreciated that although the network flow information and the next hop information for a particular network flow are described as being stored in one or more tables in the illustrative embodiment, the network flow information and/or the next hop information may be stored in a data structure (e.g., a document, a file, a database, etc.) having a different format in other embodiments. For example, the network flow information and/or the next hop information for a particular network flow may be embodied as a comma-separated value (CSV) file, a text file, an encrypted data file, an Extensible Markup Language (XML) document having one or more XML elements, or any other format suitable to store network information and/or next hop information. Additionally, it should be appreciated that although the local flow table 216 and the local next hop table 218 are described as being stored in the memory 214 of the computing node 112 in the illustrative embodiment, the local flow table 216 and the local next hop table 218 may be stored in other data storage devices of the computing node 112 in other embodiments. For example, in some embodiments, all or a portion of the local flow table 216 and/or the local next hop table 218 may be stored in a cache memory (not shown) of the processor 210.

The communication circuitry 226 of the computing nodes 110 may be embodied as any type of communication circuit, device, or collection thereof, capable of enabling communications between the computing node 112 and the other computing nodes 110 of the cluster computing device 102, the network controller 120, the network load balancer 140, and/or other computing devices via one or more communication networks (e.g., local area networks, personal area networks, wide area networks, cellular networks, a global network such as the Internet, etc.). The communication circuitry 226 may be configured to use any one or more communication technologies (e.g., wireless or wired communications) and associated protocols (e.g., Ethernet, Wi-Fi®, WiMAX, etc.) to effect such communication. In the illustrative embodiment, the communication circuitry 226 includes or is otherwise communicatively coupled to one or more communication interfaces 228. The communication interfaces 228 may be configured to communicatively couple the computing nodes 110 to any number of the other computing nodes 110, the network controller 120, the network load balancer 140, networks (e.g., physical or logical networks), and/or external computing devices (e.g., computing devices not part of the cluster computing device 102 such as the remote computing device 130).

The data storage 224 may be embodied as any type of device or devices configured for short-term or long-term storage of data such as, for example, memory devices and circuits, memory cards, hard disk drives, solid-state drives, or other data storage devices. For example, the data storage 224 may be configured to store one or more operating systems to be initialized and/or executed by the computing nodes 110. In some embodiments, portions of the operating system(s) may be copied to the memory 214 during operations for faster processing and/or any other reason.

Referring again to FIG. 1, the network controller 120 may be embodied as, or otherwise include, any type of computing device capable of performing the functions described herein including, but not limited to, a server computer, a desktop computer, a laptop computing device, a consumer electronic device, a mobile computing device, a mobile phone, a smart phone, a tablet computing device, a personal digital assistant, a wearable computing device, a smart television, a smart appliance, and/or other type of computing or networking device. As such, the network controller 120 may include devices and structures commonly found in a network controller or similar computing devices such as processors, memory devices, communication circuitry, and data storages, which are not shown in FIG. 1 for clarity of the description. In the illustrative embodiment, the network controller 120 is capable of operating in a software-defined networking (SDN) environment and/or a network functions virtualization (NFV) environment (e.g., the system 1100 illustratively shown in FIG. 11). As such, the network controller 120 may send (e.g., transmit, etc.) network flow information to the computing nodes 110 and/or other computing devices capable of operating in an SDN environment and/or a NFV environment. For instance, the network controller 120 may transmit network flow information such as, for example, a flow identifier and a flow tuple (e.g., a source IP address, a source port number, a destination IP address, a destination port number, and a protocol) of network packets associated with a network flow. In some embodiments, the network controller 120 may divide up the responsibility for processing different network flows between the computing nodes 110 of the cluster computing device 102 according to a fine-grained load balancing scheme. For example, in some embodiments, the network controller 120 may determine that one computing node 110 (e.g., the computing node A 112) should be responsible for processing network packets (e.g., performing packet forwarding operations, performing packet routing operations, performing local packet processing operations, etc.) associated with a first network flow and that a second computing node 110 (e.g., the computing node B 114) should be responsible for processing network packets associated with a second network flow. In such embodiments, the network controller 120 may be configured to transmit the network flow information corresponding to the first network flow to the first computing node 110 (e.g., the computing node A 112) and transmit the network flow information corresponding to the second network flow to the second computing node 110 (e.g., the computing node B 114).

The remote computing device 130 may be embodied as, or otherwise include, any type of computing device capable of performing the functions described herein including, but not limited to a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. As such, the remote computing device 130 may include devices and structures commonly found in computing devices such as processors, memory devices, communication circuitry, and data storages, which are not shown in FIG. 1 for clarity of the description. In some embodiments, the remote computing device 130 may be configured to transmit and/or receive network packets to/from the cluster computing device 102 and/or the computing nodes 110 of the cluster computing device 102.

The network load balancer 140 may be embodied as, or otherwise include, any type of networking or computing device capable of performing the functions described herein including, but not limited to, a network load balancer, a network switch, a network router, a network hub, a wireless access point, a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. As such, the network load balancer 140 may include devices and structures commonly found in a network load balancer or similar computing devices such as processors, memory devices, communication circuitry, and data storages, which are not shown in FIG. 1 for clarity of the description. In the illustrative embodiment, the network load balancer 140 is capable of operating in a software-defined networking (SDN) environment and/or a network functions virtualization (NFV) environment that may include, among other devices, the cluster computing device 102, the computing nodes 110 of the cluster computing device 102, and the network controller 120.

In some embodiments, the network load balancer 140 may be communicatively coupled to two or more computing nodes 110 (e.g., the computing node A 112 and the computing node B 114) of the cluster computing device 102 via separate communication links (e.g., point-to-point links, bus links, wires, cables, light guides, etc.). In such embodiments, the network load balancer 140 may receive one or more network packets from the remote computing device 130. The network packets received from the remote computing device 130 may be destined to the cluster computing device 102. As such, the network load balancer 140 distributes the received network packets across the plurality of computing nodes 110 of the cluster computing device 102 according to a coarse-grained load balancing scheme (e.g., equal-cost multi-path routing (ECMP), round-robin, etc.). However, as discussed above, the responsibility for processing the received network packets (e.g., performing packet forwarding operations, performing packet routing operations, performing local packet processing operations, etc.) may be divided up among the plurality of computing nodes 110 according to a fine-grained load balancing scheme. As such, in some embodiments, the network load balancer 140 may distribute a network packet to a computing node 110 of the cluster computing device 102 that is not responsible for processing the network packet. In such embodiments, as discussed in more detail below, each computing node 110 may be configured to determine which computing node 110 of the cluster computing device 102 is responsible for processing the received network packet and forward the received network packet to that computing node 110.

Figure 3:
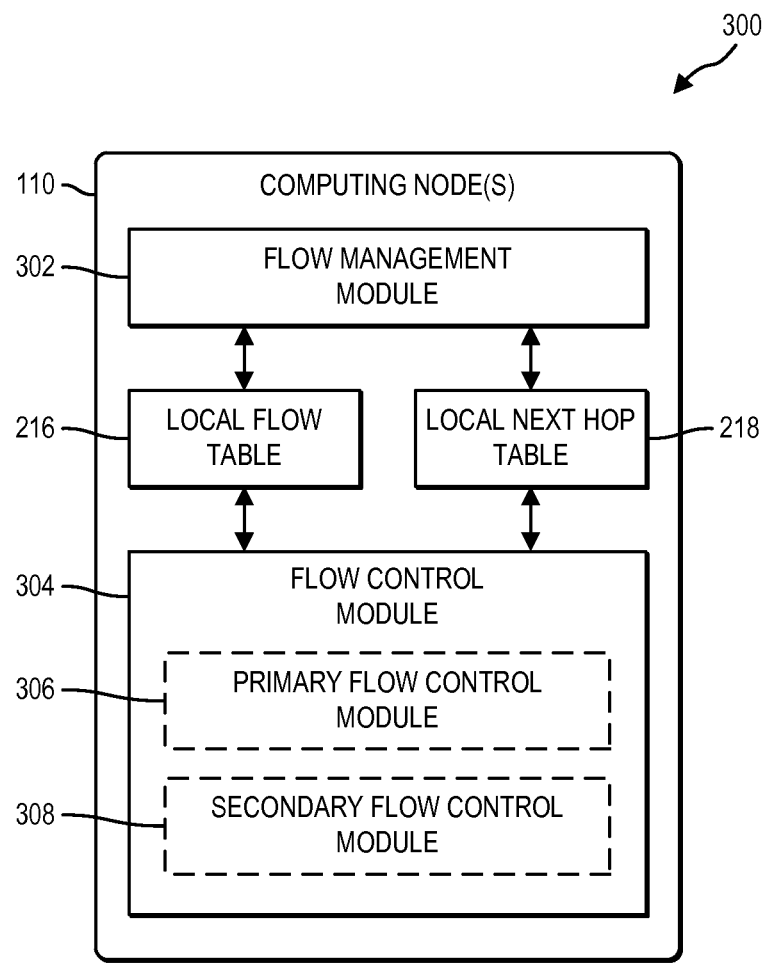
FIG. 3 is a simplified block diagram of at least one embodiment of an environment of the computing nodes of the cluster computing device of the system of FIG. 1.

Referring now to FIG. 3, in use, each of the computing nodes 110 establishes an environment 300 during operation. The illustrative environment 300 includes a flow management module 302 and a flow control module 304. In some embodiments, the flow control module 304 includes a primary flow control module 306 and a secondary flow control module 308. Each of the modules, logic, and other components of the environment 300 may be embodied as hardware, software, firmware, or a combination thereof. For example, each of the modules, logic and other components of the environment 300 may form a portion of, or otherwise be established by, the processor 210 or other hardware components each computing node 110. It should be appreciated that each computing node 110 may include other components, sub-components, modules, and devices commonly found in a computing device, which are not illustrated in FIG. 3 for clarity of the description. Additionally, it should be understood that although each of computing nodes 110 may establish the illustrative environment 300 during operation, the following discussion of that illustrative environment 300 is described with specific reference to a single computing node 112 for clarity of the description.

The flow management module 302 is configured to receive network flow information from the network controller 120. The network flow information corresponds to a network flow and any network packets associated with that network flow. For example, in some embodiments, the network flow information includes a flow identifier and a flow tuple (e.g., a source IP address, a source port number, a destination IP address, a destination port number, and a protocol) of network packets associated with a particular network flow. It should be appreciated that the network flow information may include any other type of information corresponding to a particular network flow.

The flow management module 302 is also configured to add network flow entries to the local flow table 216 of the computing node 112 based on the network flow information received from the network controller 120. For example, the flow management module 302 is configured to add a network flow entry to the local flow table 216 of the computing node 112 in response to receiving network flow information from the network controller 120 that corresponds to a particular network flow. The network flow entry added to the local flow table 216 includes the flow identifier, the flow tuple, a next hop type, and a next hop index corresponding to the network flow associated with the received network flow information. In embodiments in which the flow management module 302 receives network flow information from the network controller 120, the flow management module 302 is configured to update or otherwise configure the next hop type of the network flow entry added to the local flow table 216 to indicate that the network packets corresponding to the particular network flow should be processed locally by the computing node 112. In such embodiments, the flow management module 302 may also be configured to update or otherwise configure the next hop index of the network flow added to the local flow table 216 to include a null value.

In some embodiments, the flow management module 302 may be configured to receive the network flow information from the network controller 120 as one or more OpenFlow messages. Additionally or alternatively, the flow management module 302 may be configured to receive the network information from the network controller 120 as one or more Simple Object Access Protocol (SOAP) messages. Of course it should be appreciated that any other suitable messaging and/or notification protocol (e.g., representational state transfer (REST) message, Extensible Markup Language (XML), etc.) may be used by the flow management module 302 to receive the network flow information from the network controller 120.

The flow management module 302 is also configured to generate a multicast network packet based on the network flow information received from the network controller 120. The multicast network packet generated by the flow management module 302 may include the flow tuple (e.g., the source IP address, the source port number, the destination IP address, the destination port number, and the protocol) corresponding to the network flow. The multicast network packet generated by the flow management module 302 also includes a next hop internet protocol (IP) address to indicate or otherwise identify the computing node 112 as the computing node 110 responsible for processing network packets corresponding to the particular network flow. In some embodiments, the flow management module 302 may also be configured to determine a local IP address corresponding to an interface 228 of the computing node 112 communicatively coupled to one or more other computing nodes 110 of the cluster computing device 102. In such embodiments, the next hop IP address included within the multicast network packet may be embodied as the local IP address corresponding to the interface 228 of the computing node 112. The flow management module 302 is configured to transmit the generated multicast network packet to each of the other computing nodes 110 of the cluster computing device 102 via a multicast communication transmission, a broadcast communication transmission, a unicast communication transmission, and/or any other type of communication transmission suitable for transmitting the multicast network packet to each of the other computing nodes 110 (e.g., remote direct memory access (RDMA), etc.).

Additionally or alternatively, the flow management module 302 may be configured to receive a multicast network packet from another one of the computing nodes 110 of the cluster computing device 102. The received multicast network packet may include a flow identifier, a flow tuple, and a next hop IP address corresponding to a particular network flow. The next hop IP address indicates or otherwise identifies the particular computing node 110 of the cluster computing device 102 to which network packets corresponding to the particular network flow should be forwarded for further processing. In some embodiments, in response to receiving a multicast network packet from another one of the computing nodes 110, the flow management module 302 may be configured to add a network flow entry to the local flow table 216 of the computing node 112 based on the received multicast network packet. In embodiments in which the flow management module 302 receives a multicast network packet from another one of the computing nodes 110, the flow management module 302 is configured to update or otherwise configure the next hop type of the network flow entry added to the local flow table 216 to indicate that network packets corresponding to the particular network flow should be processed remotely by another one of the computing nodes 110 of the cluster computing device 102.

Additionally, in embodiments in which the flow management module 302 receives a multicast network packet from another one of the computing nodes 110, the flow management module 302 is configured to add a next hop entry to the local next hop table 218 of the computing node 112 based on the received multicast network packet. The next hop entry added to the local next hop table 218 includes a next hop identifier and the next hop IP address from the multicast network packet received from the other computing node 110. The next hop index uniquely identifies the added next hop entry from a plurality of other next hop entries stored or otherwise maintained in the local next hop table 218 of the computing node 112. In some embodiments, the next hop entry added to the local next hop table 218 also includes a media access control (MAC) address associated with the particular computing node 110 of the cluster computing device 102 to which network packets corresponding to the particular network flow should be forwarded for further processing. In such embodiments, the flow management module 302 may be configured to determine the MAC address of the computing node 110 responsible for processing the network packets corresponding to the network flow based on an address resolution protocol (ARP) table and the next hop IP address.

The flow control module 304 is configured to receive a network packet from the network load balancer 140 and/or another one of the computing nodes 110 of the cluster computing device 102. In some embodiments, the flow control module 304 is configured to determine whether the computing node 112 or another computing node 110 of the cluster computing device 102 is responsible for processing the received network packet. To do so, the flow control module 304 is configured to determine source and destination information (e.g., a 5-tuple) associated with the received network packet. The flow control module 304 may further be configured to perform a flow lookup operation on the local flow table 216 of the computing node 112. In operation, the flow control module 304 is configured to compare the source and destination information (e.g., the 5-tuple) associated with the received network packet to the flow tuples of the network flow entries of the local flow table 216.

In response to identifying the network flow entry of the local flow table 216 including a flow tuple that matches or is substantially similar to the source and destination information (e.g., the 5-tuple) associated with the received network packet, the flow control module 304 is configured to determine the next hop type of the identified flow entry. For example, in some embodiments, the flow control module 304 may be configured to determine whether the next hop type of the identified flow entry indicates whether the received network packet should be processed locally by the computing node 112 or whether the received network packet should be processed remotely by another computing node 110 of the cluster computing device 102.

The flow control module 304 may also be configured to process the received network packet based on the determined next hop type of the identified flow entry. To do so, in some embodiments, the flow control module 304 includes the primary flow control module 306 and the secondary flow control module 308. The primary flow control module 306 may be configured to locally process the received network packet in response to a determination that the received network packet should be processed locally. For example, in some embodiments, the primary flow control module 306 may be configured to save or otherwise forward the received network packet to a local memory queue of the computing node 112 and subsequently notify (e.g., via an interrupt or polling) an application being executed by the computing node 112 that the received network packet is available to be processed.

The secondary flow control module 308 may be configured to determine a next hop computing node 110 responsible for further processing of the received network packet in response to a determination that the received network packet should be processed remotely by another computing node 110 of the cluster computing device 102. To do so, the secondary flow control module 308 may be configured to utilize the next hop index of the identified flow entry of the local flow table 216 to retrieve the corresponding next hop entry stored in the local next hop table 218. In some embodiments, the secondary flow control module 308 may also be configured to retrieve a corresponding MAC address of the next hop computing node 110 from the corresponding next hop entry stored in the local next hop table 218. Additionally, the secondary flow control module 308 may be configured to transmit (e.g., forward, route, send, etc.) the received network packet to the determined next hop computing node 110.

Figure 4:
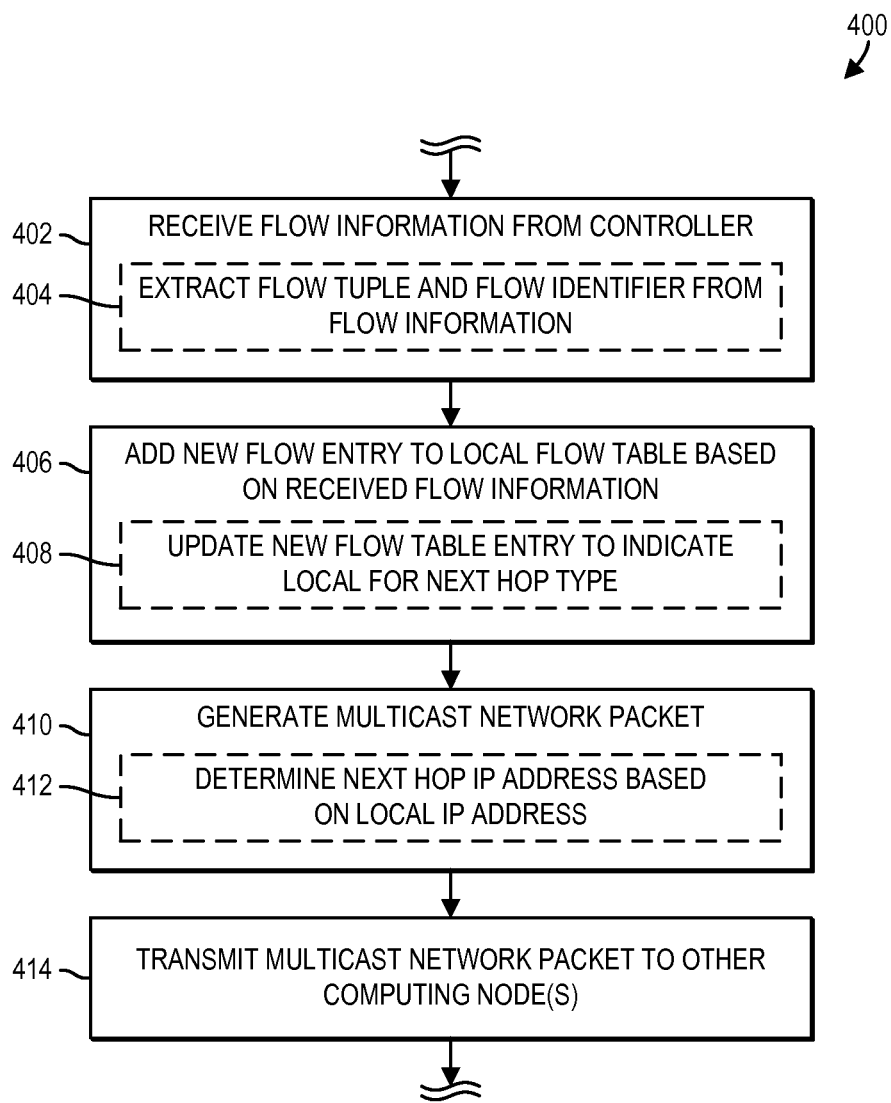
FIG. 4 is a simplified flow diagram of at least one embodiment of a method for receiving network flow information from a network controller that may be executed by a computing node of the cluster computing device of the system of FIG. 1.

Referring now to FIG. 4, a computing node 110 of the cluster computing device 102 may execute a method 400 for receiving network flow information from the network controller 120. One embodiment of a pseudocode 500 corresponding to the method 400, and which may be executed by the computing node 110, is illustratively shown in FIG. 5. Of course, it should be appreciated that the computing node 110 may execute different and/or additional instructions or commands when executing the method 400.

The method 400 begins with block 402 in which the computing node 110 receives network flow information associated with a network flow from the network controller 120. The network flow information may be indicative of the particular computing node 110 of the cluster computing device 102 responsible for processing network packets associated with the network flow. In some embodiments, the network flow information received from the network controller 120 includes a flow identifier and a flow tuple (e.g., a source IP address, a source port number, a destination IP address, a destination port number, and a protocol) corresponding to the network flow. In such embodiments, in block 404, the computing node 110 may extract the flow identifier and the flow tuple from the received network information.

In block 406, the computing node 110 adds a network flow entry for the network flow to its local flow table 216 based on the network flow information received from the network controller 120. The network flow entry added to the local flow table 216 includes the flow identifier, the flow tuple, a next hop type, and a next hop index corresponding to the network flow associated with the received network flow information. The flow identifier of the added network flow entry uniquely identifies the added network flow entry from a plurality of other network flow entries stored or otherwise maintained in the local flow table 216 of the computing node 110. The next hop type of the added network flow entry indicates whether network packets associated with the corresponding network flow are to be processed locally by the computing node 110 or remotely by another one of the computing nodes 110 of the cluster computing device 102. In some embodiments, in block 408, the computing node 110 updates or otherwise configures the next hop type of the added network flow entry to indicate that the network packets associated with the corresponding network flow are to be processed locally. For example, the computing node 110 may update the next hop type to include or otherwise indicate a value of "NHOP_LOCAL" (or a similar value) in response to receiving the network flow information from the network controller 120. It should be appreciated that any other value or identifier may be used to indicate that the network packets associated with the corresponding network flow are to be processed locally by the computing node 110. Additionally, in embodiments in which the computing node 110 receives the network flow information from the network controller 120 and updates the next hop type field of the network flow entry added to its local flow table 216 to indicate that the network packets associated with the corresponding network flow are to be processed locally, the computing node 110 may assume primary responsibility for processing the network packets associated with the corresponding network flow.

In block 410, the computing node 110 generates a multicast network packet including the network information received from the network controller 120. For example, computing node 110 generates a multicast network packet including the flow identifier and the and the flow tuple (e.g., the source IP address, the source port number, the destination IP address, the destination port number, and the protocol) corresponding to the network flow. In some embodiments, the multicast network packet generated by the computing node 110 also includes a next hop internet protocol (IP) address to indicate or otherwise identify the particular computing node 110 of the cluster computing device 102 to which received network packets corresponding to the network flow should be forwarded for further processing. In embodiments in which the computing node 110 assumes primary responsibility for processing network packet corresponding to the network flow, the next hop IP address may be an IP address associated with the computing node 110. For example, in block 412, the computing node 110 may determine a local IP address corresponding to an interface 228 of the computing node 110 communicatively coupled to one or more other computing nodes 110 of the cluster computing device 102. In such embodiments, the next hop IP address included within the multicast network packet may be embodied as the local IP address corresponding to the interface 228 of the computing node 110. It should be appreciated that although the network packet generated by the computing node 110 is described as being a multicast network packet in the illustratively embodiment, any other type of packet (e.g., broadcast, etc.) may be generated by the computing node 110 in other embodiments.

In block 414, the computing node 110 transmits the multicast network packet to the other computing nodes 110 of the cluster computing device 102. In some embodiments, the multicast network packet may be transmitted to each of the other computing nodes 110 of the cluster computing device 102 via a multicast communication transmission, a broadcast communication transmission, a unicast communication transmission, and/or any other type of communication transmission suitable for transmitting the multicast network packet to each of the other computing nodes 110 (e.g., remote direct memory access (RDMA), etc.). As discussed, in response to receiving the multicast network packet from the computing node 110, each of the other computing nodes 110 of the cluster computing device 102 may be configured to add a corresponding flow entry to their own local flow table 216 and an associated next hop entry to their own local next hop table 218.

Figure 6:
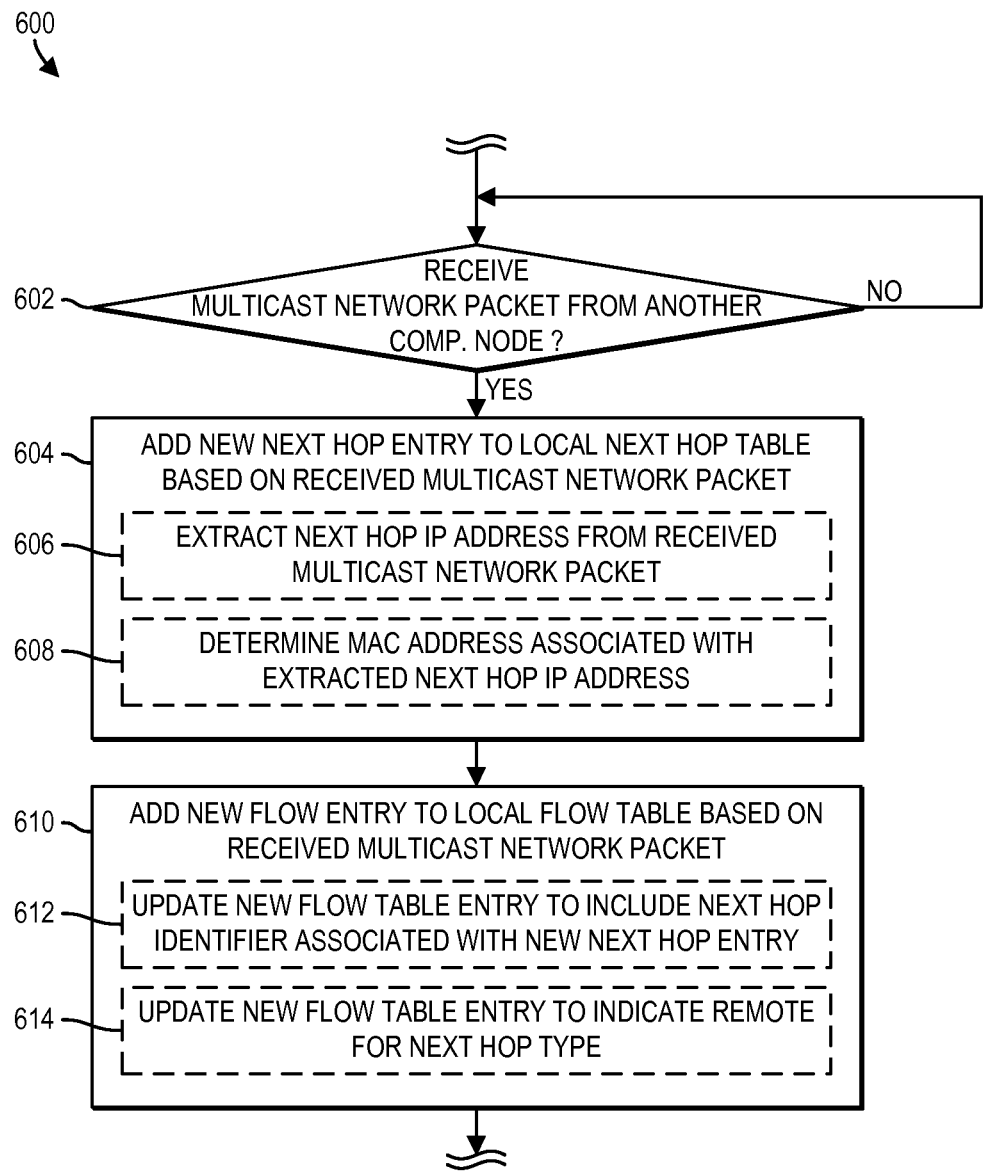
FIG. 6 is a simplified flow diagram of at least one embodiment of a method for receiving network flow information from another computing node of the cluster computing device that may be executed by a computing node of the cluster computing device of the system of FIG. 1.

Referring now to FIG. 6, a computing node 110 of the cluster computing device 102 may execute a method 600 for receiving network flow information from another computing node 110 of the cluster computing device 102. One embodiment of a pseudocode 700 corresponding to the method 600, and which may be executed by the computing node 110, is illustratively shown in FIG. 7. Of course, it should be appreciated that the computing node 110 may execute different and/or additional instructions or commands when executing the method 600. The method 600 begins with decision block 602 in which the computing node 110 determines whether a multicast network packet is received from another computing node 110 of the cluster computing device 102. In some embodiments, the computing node 110 may receive the multicast network packet from the other computing node 110 in response to the other computing node 110 receiving network information corresponding to a network flow from the network controller 120. If, in decision block 602, the computing node 110 determines that a multicast network packet is not received from the another computing node 110 of the cluster computing device 102, the method 600 loops back to decision block 602 and the computing node 110 continues determining whether a multicast network packet is received. If, however, the computing node 110 determines instead in decision block 602 that a multicast network packet is received from another computing node 110, the method 600 advances to block 604.

In block 604, the computing node adds a next hop entry to its local next hop table 218 based on the multicast network packet received from the other computing node 110 of the cluster computing device 102. The received multicast network packet may include a flow identifier, a flow tuple, and a next hop IP address corresponding to the network flow. The next hop entry added to the local next hop table 218 includes a next hop identifier and the next hop IP address from the multicast network packet received from the other computing node 110. The next hop index uniquely identifies the added next hop entry from a plurality of other next hop entries stored or otherwise maintained in the local next hop table 218 of the computing node 110. The next hop IP address indicates or otherwise identifies the particular computing node 110 of the cluster computing device 102 to which network packets corresponding to the network flow should be forwarded for further processing. That is, the next hop IP address may be associated with the computing node 110 of the cluster computing device 102 having or otherwise assuming primary responsibility for processing network packets corresponding to the network flow, which may be received from the remote computing device 130 via the network load balancer 140. In such embodiments, in block 606, the computing node 110 may extract the next hop IP address from the received multicast network packet.

In some embodiments, to facilitate forwarding the received network packets corresponding to the network flow to the computing node 110 of the cluster computing device 102 having primary responsibility for processing the network packets, the next hop entry added to the local next hop table 218 may also include a media access control (MAC) address associated with the computing node 110 of the cluster computing device 102 having primary responsibility for processing the network packets. In such embodiments, in block 608, the computing node 110 may determine the MAC address of the computing node 110 of the cluster computing device 102 having primary responsibility for processing network packets corresponding to the network flow. To do so, the computing node 110 may utilize an address resolution protocol (ARP) table to look up the MAC address of the computing node 110 having primary responsibility for processing network packets corresponding to the network flow based on the next hop IP address. Subsequently, the computing node 110 may update the MAC address field and/or value of the next hop entry added to the local next hop table 218 to include the MAC address of the computing node 110 of the cluster computing device 102 having primary responsibility. As discussed below, the next hop entry added to the local next hop table 218 of the computing node 110 is associated with a network flow entry added to the local flow table 216 of the computing node 110.

In block 610, the computing node 110 adds the network flow entry for the network flow to its local flow table 216 based on the multicast network packet received from the other computing node 110 of the cluster computing device 102. The network flow entry added to the local flow table 216 includes the flow identifier and the flow tuple from the multicast network packet received from the other computing node 110. Additionally, the network flow entry added to the local flow table 216 includes a next hop index and a next hop type corresponding to the network flow. As discussed, the next hop entry added to the local next hop table 218 of the computing node 110 is associated with the network flow entry added to the local flow table 216 of the computing node 110. In some embodiments, in block 612, the computing node 110 updates the next hop index of the network flow entry added to the local flow table 216 to include the next hop index associated with the next hop entry added to the local next hop table 218. In that way, the computing node 110 may utilize the next hop index of the network flow entry added to the local flow table 216 to retrieve all or a portion of the next hop information (e.g., the next hop IP and/or the corresponding MAC address) from the local next hop table 218.

As discussed, the next hop type of the added network flow entry indicates whether network packets associated with the corresponding network flow are to be processed locally by the computing node 110 or remotely by another one of the computing nodes 110 of the cluster computing device 102. In some embodiments, in response to receiving the multicast network packet from the other computing node 110, the computing node 110 in block 614 updates or otherwise configures the next hop type of the added network flow entry to indicate that the network packets associated with the corresponding network flow are to be processed remotely. For example, the computing node 110 may update the next hop type to include or otherwise indicate a value of "NHOP_REMOTE" (or a similar value) in response to receiving the multicast network packet from the other computing node 110 of the cluster computing device 102. It should be appreciated that any other value or identifier may be used to indicate that the network packets associated with the corresponding network flow are to be processed remotely by another computing node 110 of the cluster computing device 102. Additionally, in embodiments in which the computing node 110 receives the multicast network packet from the other computing node 110 and updates the next hop type field of the network flow entry added to its local flow table 216 to indicate that the network packets associated with the corresponding network flow are to be processed remotely, the computing node 110 may assume secondary responsibility for processing the network packets associated with the corresponding network flow. That is, the computing node 110 may forward network packets associated with the corresponding network flow to the other computing node 110 for further processing.

Figure 8:
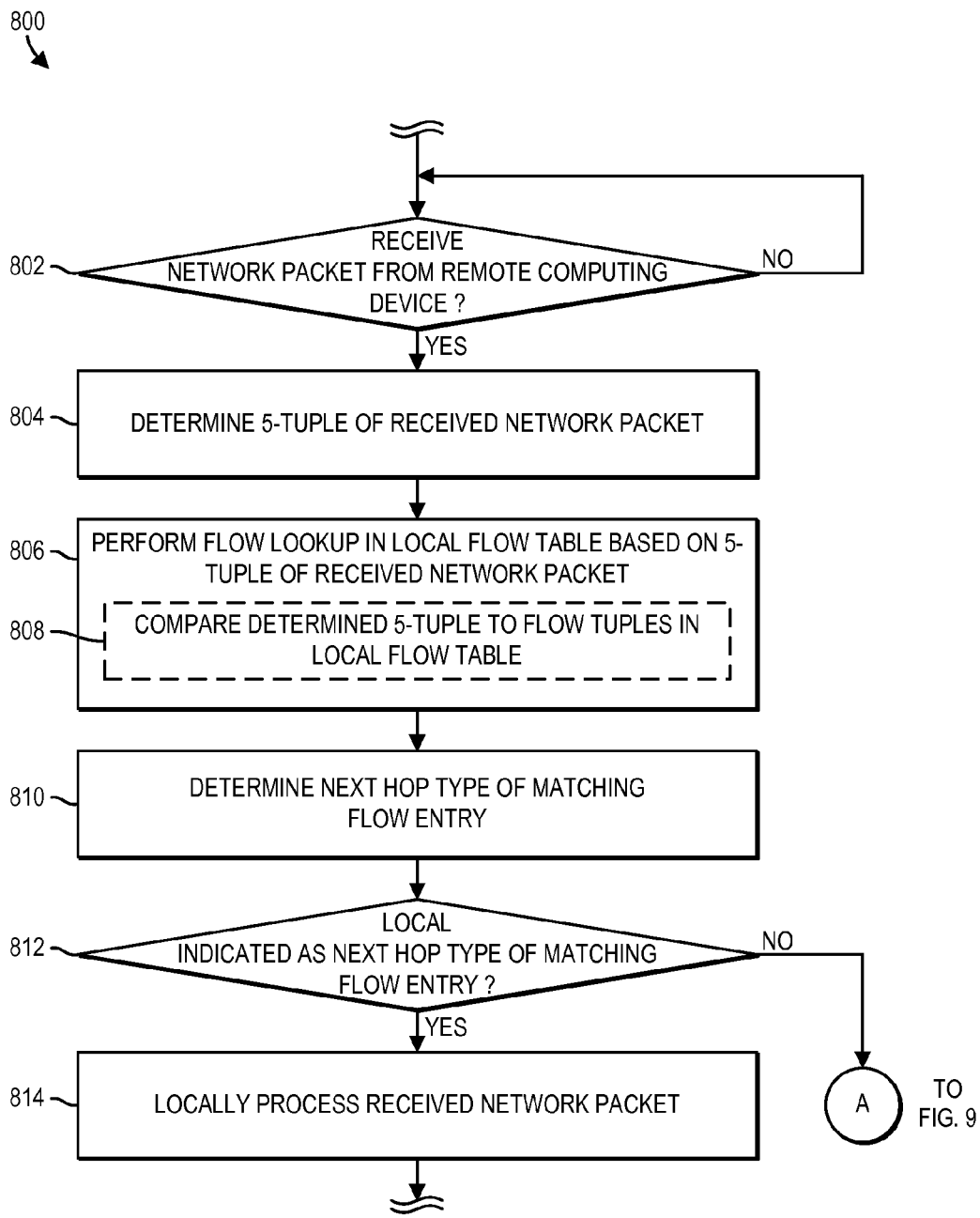
FIGS. 8 and 9 is a simplified flow diagram of at least one embodiment of a method for processing a network packet received from a remote computing device that may be executed by a computing node of the cluster computing device of the system of FIG. 1.
Figure 9:
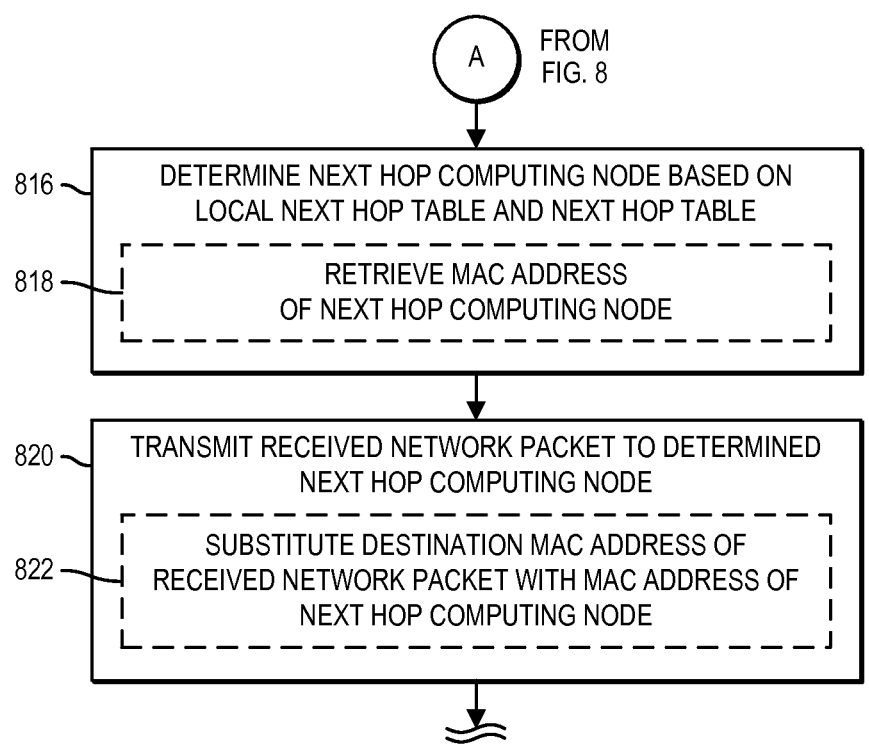

Referring now to FIGS. 8 and 9, a computing node 110 of the cluster computing device 102 may execute a method 800 for processing a network packet received from the remote computing device 130. One embodiment of a pseudocode 1000 corresponding to the method 800, and which may be executed by the computing node 110, is illustratively shown in FIG. 10. Of course, it should be appreciated that the computing node 110 may execute different and/or additional instructions or commands when executing the method 800. The method 800 begins with decision block 802 in which the computing node 110 determines whether a network packet is received from the remote computing device 130. In some embodiments, the network packet may be received from the remote computing device 130 via the network load balancer 140. As discussed, the network load balancer 140 may forward the network packet from the remote computing device 130 to the computing node 110 according to a coarse-grained load balancing scheme (e.g., equal-cost multi-path routing (ECMP), round-robin, etc.). If, in decision block 802, the computing node 110 determines that a network packet is not received from the remote computing device 130, the method 800 loops back to decision block 802 and the computing node 110 continues determining whether a network packet is received. If, however, the computing node 110 determines that a network packet is received from the remote computing device 130, the method 800 advances to block 804 in which the computing node 110 determines source and destination information (e.g., a 5-tuple) of the received network packet.

In block 806, the computing node 110 performs a flow lookup in the local flow table 216 based on the source and destination information (e.g., the 5-tuple) of the received network packet. To do so, in some embodiments, the computing node 110 in block 808 compares the determined source and destination information (e.g., the 5-tuple) of the received network packet to the flow tuples of the network flow entries of the local flow table 216. Based on the comparison, the computing node 110 determines the network flow entry of the local flow table 216 including a flow tuple that matches or is otherwise substantially similar to the 5-tuple of the received network packet.

In block 810, the computing node 110 determines the next hop type of the flow entry of the local flow table 216 including the flow tuple that matches or is otherwise substantially similar to the 5-tuple of the received network packet. In decision block 812, the computing node 110 determines whether the next hop type of the matching flow entry of the local flow table 216 indicates that the network packet is to be processed locally. To do so, in some embodiments, the computing node 110 may determine whether the next hop type of the matching flow entry of the local flow table 216 includes or is otherwise indicative of a value of "NHOP_LOCAL" (or a similar value). As discussed, in embodiments in which the matching flow entry of the local flow table 216 indicates that the network packet is to be processed locally, the computing node 110 assumes primary responsibility for processing the network packets (and subsequently received network packets) associated with the corresponding network flow. However, in embodiments in which the matching flow entry of the local flow table 216 indicates the network packet is to be processed remotely (e.g., processed by a different computing node 110 of the cluster computing device 102), the computing node 110 assumes secondary responsibility for processing the network packets (and subsequently received network packets) associated with the corresponding network flow. That is, the computing node 110 may forward the network packet (and subsequently received network packets) associated with the corresponding network flow to another computing node 110 of the cluster computing device 102 for further processing. If, in decision block 812, the computing node 110 determines that the next hop type of the matching flow entry indicates that the network packet is to be processed locally, the method 800 advances to block 814. If, however, in decision block 812, the computing node 110 determines that the next hop type of the matching flow entry does not indicate that the network packet is to be processed locally (e.g., that the network packet is to be processed remotely), the method 800 advances instead to block 816.

In block 814, the computing node 110 locally processes the received network packet. For example, in some embodiments, the computing node 110 passes the flow identifier of the matching flow entry to an application layer of the computing node 110. In another example, the computing node 110 saves or otherwise forwards the received network packet to a local memory queue and notifies (e.g., via an interrupt or polling) an application being executed by the computing node 110 that the received network packet is available to be processed.

In block 816, the computing node 110 determines a next hop computing node 110 (e.g., another one of the computing nodes 110 of the cluster computing device 102) responsible for further processing of the received network packet based on the local flow table 216 and the local next hop table 218. To do so, in some embodiments, the computing node 110 utilizes the next hop index of the matching flow entry to retrieve the corresponding next hop entry stored in the local next hop table 218. As discussed, the next hop entry corresponding to the matching flow entry includes the next hop IP and/or the corresponding MAC address of the next hop computing node 110. In embodiments in which the next hop entry includes the MAC address of the next hop computing node 110, the computing node 110 retrieves, in block 818, the MAC address of the next hop computing node 110 from the local next hop table 218.

In block 820, the computing node 110 transmits (e.g., forwards, routes, sends, etc.) the received network packet to the determined next hop computing node 110. To do so, in some embodiments, the computing node 110 in block 822 substitutes or otherwise replaces the destination MAC address of the received network packet with the MAC address of the next hop computing node 110. As discussed, the next hop computing node 110 (e.g., the different computing node 110 of the cluster computing device 102) may be configured to further process the received network packet.

Figure 11:
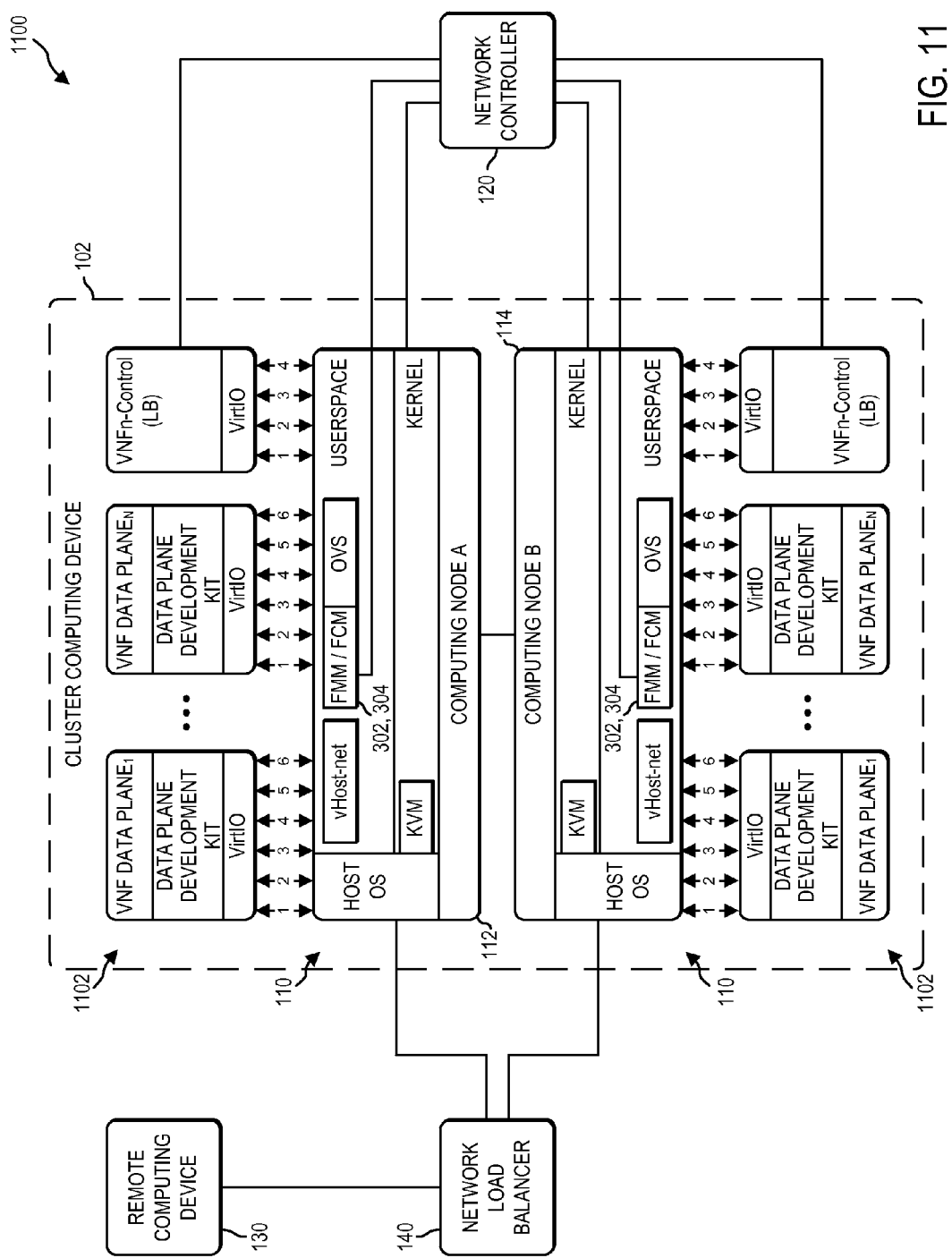
FIG. 11 is a simplified block diagram of at least one embodiment of a system for bridging between coarse-grained and fine-grained load balancing on a cluster computing device including a number of computing nodes operating in a network functions virtualization (NFV) environment.

Referring now to FIG. 11, in an illustrative embodiment a system 1100 for bridging between coarse-grained and fine-grained load balancing includes the cluster computing device 102 having a plurality of computing nodes 110, the network controller 120, the remote computing device 130, and the network load balancer 140, each of which may be capable of operating in a network functions virtualization (NFV) environment. It should be appreciated that the cluster computing device 102, the computing nodes 110 (e.g., the computing node A 112 and the computing node B 114) of the cluster computing device 102, the remote computing device 130, and the network load balancer 140 shown in FIG. 11 may include functionality, features, and/or structure substantially similar to the cluster computing device 102, the computing nodes 110, the remote computing device 130, and the network load balancer 140 described above with reference to FIGS. 1-3. As illustratively shown in FIG. 11, the system 1100 may also include the flow management module (FMM) 302 and the flow control module (FCM) 304. It should be appreciated that the flow management module 302 and the flow control module 304 shown in FIG. 11 may include functionality and/or features similar to the flow management module 302 and the flow control module 304 described above with reference to FIG. 3. In operation, the computing node A 112 and the computing node B 114 may each include one or more virtual machines (or virtual environments) for providing any number of virtual network functions 1102. The flow management module 302 and the flow control module 304 of each of the computing nodes 110 (e.g., the computing node A 112 and the computing node B 114) of the system 1100 may be configured to enable each of the computing nodes 110 to assume primary responsibility for processing network packets corresponding to the virtual network functions 1102 they each provide. Additionally, the flow management module 302 and the flow control module 304 of each of the computing nodes 110 (e.g., the computing node A 112 and the computing node B 114) of the system 1100 may be configured to enable each of the computing nodes 110 to assume secondary responsibility for processing network packets corresponding to the virtual network functions 1102 provided by other computing nodes 110 of the cluster computing device 102.

Examples

Illustrative examples of the technologies disclosed herein are provided below. An embodiment of the technologies may include any one or more, and any combination of, the examples described below.

Example 1 includes a computing node of a cluster computing device to bridge between coarse-grained and fine-grained load balancing, the computing node including a memory having (i) a local flow table to store a plurality of network flow entries and (ii) a local next hop table to store forwarding information for one or more of the plurality of network flow entries; a flow management module to (i) receive network flow information from a network controller (ii) add a network flow entry to the local flow table based on the network flow information received from the network controller, (iii) generate a multicast network packet including the network flow information received from the network controller and an internet protocol address associated with the computing node, and (iv) transmit the multicast network packet to each other computing node of the cluster computing device to facilitate the addition of a different network flow entry to a local flow table of each other computing node and a next hop entry to a local next hop table of each other computing node based on the multicast network packet.

Example 2 includes the subject matter of Example 1, and wherein the network flow entry added to the local flow table of the computing node includes a flow tuple that indicates a source and a destination of network packets associated with a network flow, a flow identifier that uniquely identifies the added network flow entry from each other network flow entry of the plurality of network flow entries stored in the local flow table of the computing node, a next hop index that identifies an associated next hop entry of the local next hop table of the computing node, and a next hop type that indicates whether the network packets associated with the network flow are to be processed locally by the computing node or remotely by another computing node of the cluster computing device.

Example 3 includes the subject matter of any of Examples 1 and 2, and wherein the network flow information received from the network controller includes the flow tuple and the flow identifier.

Example 4 includes the subject matter of any of Examples 1-3, and wherein the flow management module is further to (i) configure the next hop type of the network flow entry added to the local flow table to indicate that the network packets associated with the network flow are to be processed locally by the computing node and (ii) configure the next hop index of the network flow entry added to the local flow table with a null value.

Example 5 includes the subject matter of any of Examples 1-4, and wherein the flow management module is further to determine a local internet protocol address associated with an interface of the computing node communicatively coupled to one or more other computing nodes of the cluster computing device; and wherein the internet protocol address associated with the computing node includes the local internet protocol address associated with the interface of the computing node.

Example 6 includes the subject matter of any of Examples 1-5, and wherein each network flow entry of the local flow table of the computing node includes a flow tuple that indicates a source and a destination of network packets associated with a network flow, a flow identifier that uniquely identifies the network flow entry from each other network flow entry of the plurality of network flow entries stored in the local flow table of the computing node, a next hop index that identifies a next hop entry of a plurality of next hop entries stored in the local next hop table of the computing node associated with the network flow entry, and a next hop type that indicates whether the network packets associated with the network flow are to be processed locally by the computing node or remotely by another computing node of the cluster computing device.

Example 7 includes the subject matter of any of Examples 1-6, and further including a flow control module to (i) receive a network packet from a remote computing device, (ii) determine a 5-tuple of the received network packet, (iii) perform a flow lookup operation on the local flow table of the computing node to determine a network flow entry of the plurality of network flow entries that includes the flow tuple that matches the 5-tuple of the received network packet, (iv) determine whether the next hop type associated with the determined network flow entry indicates that the network packets associated with the network flow are to be processed locally by the computing node or remotely by another computing node of the cluster computing device, (v) process the network packet in response to a determination that the next hop type associated with the determined network flow entry indicates that the network packets associated with the network flow are to be processed locally by the computing node, and (vi) forward the received network packet to a next hop computing node of the cluster computing device in response to a determination that the next hop type associated with the determined network flow entry indicates that the network packets associated with the network flow are to be processed remotely by another computing node of the cluster computing device.

Example 8 includes the subject matter of any of Examples 1-7, and wherein the flow control module is further to determine the next hop computing node of the cluster computing device to process the received network packet.

Example 9 includes the subject matter of any of Examples 1-8, and wherein the flow control module is further to perform a next hop lookup operation on the local next hop table of the computing node as a function of the next hop index associated with the determined network flow entry to determine a matching next hop entry of the plurality of next hop entries; and wherein to determine the next hop computing node includes to determine the next hop computing node of the cluster computing device to process the received network packet as a function of the matching next hop entry.

Example 10 includes the subject matter of any of Examples 1-9, and wherein the flow control module is further to (i) determine a media access control address of the next hop computing node based on the matching next hop entry of the local next hop table of the computing node and (ii) substitute a destination media access control address of the received network packet with the determined media access control address of the next hop computing node; and wherein to forward the received network packet to the next hop computing node includes to forward the received network packet to the next hop computing node based on the substituted destination media access control address of the received network packet.

Example 11 includes a method for bridging between coarse-grained and fine-grained load balancing, the method including storing, by a computing node of a cluster computing device, a plurality of network flow entries in a local flow table of the computing node; storing, by the computing node, forwarding information for one or more of the plurality of network flow entries in a local next hop table of the computing node; receiving, by the computing node, network flow information from a network controller; adding, by the computing node, a network flow entry to the local flow table of the computing node based on the network flow information received from the network controller; generating, by the computing node, a multicast network packet including the network flow information received from the network controller and an internet protocol address associated with the computing node; and transmitting, by the computing node, the multicast network packet to each other computing node of the cluster computing device to facilitate the addition of a different network flow entry to a local flow table of each other computing node and a next hop entry to a local next hop table of each other computing node based on the multicast network packet.

Example 12 includes the subject matter of Example 11, and wherein the network flow entry added to the local flow table of the computing node includes a flow tuple that indicates a source and a destination of network packets associated with a network flow, a flow identifier that uniquely identifies the added network flow entry from each other network flow entry of the plurality of network flow entries stored in the local flow table of the computing node, a next hop index that identifies an associated next hop entry of the local next hop table of the computing node, and a next hop type that indicates whether the network packets associated with the network flow are to be processed locally by the computing node or remotely by another computing node of the cluster computing device.

Example 13 includes the subject matter of any of Examples 11 and 12, and wherein the network flow information received from the network controller includes the flow tuple and the flow identifier.

Example 14 includes the subject matter of any of Examples 11-13, and further including configuring, by the computing node, the next hop type of the network flow entry added to the local flow table to indicate that the network packets associated with the network flow are to be processed locally by the computing node; and configuring, by the computing node, the next hop index of the network flow entry added to the local flow table with a null value.

Example 15 includes the subject matter of any of Examples 11-14, and further including determining, by the computing node, a local internet protocol address associated with an interface of the computing node communicatively coupled to one or more other computing nodes of the cluster computing device; and wherein the internet protocol address associated with the computing node includes the local internet protocol address associated with the interface of the computing node.

Example 16 includes the subject matter of any of Examples 11-15, and wherein each network flow entry of the local flow table of the computing node includes a flow tuple that indicates a source and a destination of network packets associated with a network flow, a flow identifier that uniquely identifies the network flow entry from each other network flow entry of the plurality of network flow entries stored in the local flow table of the computing node, a next hop index that identifies a next hop entry of a plurality of next hop entries stored in the local next hop table of the computing node associated with the network flow entry, and a next hop type that indicates whether the network packets associated with the network flow are to be processed locally by the computing node or remotely by another computing node of the cluster computing device.

Example 17 includes the subject matter of any of Examples 11-16, and further including receiving, by the computing node, a network packet from a remote computing device; determining, by the computing node, a 5-tuple of the received network packet; performing, by the computing node, a flow lookup operation on the local flow table of the computing node to determine a network flow entry of the plurality of network flow entries that includes the flow tuple that matches the 5-tuple of the received network packet; determining, by the computing node, whether the next hop type associated with the determined network flow entry indicates that the network packets associated with the network flow are to be processed locally by the computing node or remotely by another computing node of the cluster computing device; processing, by the computing node, the network packet in response to a determination that the next hop type associated with the determined network flow entry indicates that the network packets associated with the network flow are to be processed locally by the computing node; and forwarding, by the computing node, the received network packet to a next hop computing node of the cluster computing device in response to a determination that the next hop type associated with the determined network flow entry indicates that the network packets associated with the network flow are to be processed remotely by another computing node of the cluster computing device.

Example 18 includes the subject matter of any of Examples 11-17, and further including determining, by the computing node, the next hop computing node of the cluster computing device to process the received network packet.

Example 19 includes the subject matter of any of Examples 11-18, and further including performing, by the computing node, a next hop lookup operation on the local next hop table of the computing node as a function of the next hop index associated with the determined network flow entry to determine a matching next hop entry of the plurality of next hop entries; and wherein determining the next hop computing node includes determining the next hop computing node of the cluster computing device to process the received network packet as a function of the matching next hop entry.

Example 20 includes the subject matter of any of Examples 11-19, and further including determining, by the computing node, a media access control address of the next hop computing node based on the matching next hop entry of the local next hop table of the computing node; substituting, by the computing node, a destination media access control address of the received network packet with the determined media access control address of the next hop computing node; and wherein forwarding the received network packet to the next hop computing node includes forwarding the received network packet to the next hop computing node based on the substituted destination media access control address of the received network packet.

Example 21 includes a computing node of a cluster computing device to bridge between coarse-grained and fine-grained load balancing, the computing node including a processor; and a memory having stored therein a plurality of instructions that when executed by the processor cause the computing node to perform the method of any of Examples 11-20.

Example 22 includes one or more machine-readable media having a plurality of instructions stored thereon that in response to being executed result in computing node of a cluster computing device performing the method of any of Examples 11-20.

Example 23 includes a computing node of a cluster computing device to bridge between coarse-grained and fine-grained load balancing, the computing node including means for storing a plurality of network flow entries in a local flow table of the computing node; means for storing forwarding information for one or more of the plurality of network flow entries in a local next hop table of the computing node; means for receiving network flow information from a network controller; means for adding a network flow entry to the local flow table of the computing node based on the network flow information received from the network controller; means for generating a multicast network packet including the network flow information received from the network controller and an internet protocol address associated with the computing node; and means for transmitting the multicast network packet to each other computing node of the cluster computing device to facilitate the addition of a different network flow entry to a local flow table of each other computing node and a next hop entry to a local next hop table of each other computing node based on the multicast network packet.

Example 24 includes the subject matter of Example 23, and wherein the network flow entry added to the local flow table of the computing node includes a flow tuple that indicates a source and a destination of network packets associated with a network flow, a flow identifier that uniquely identifies the added network flow entry from each other network flow entry of the plurality of network flow entries stored in the local flow table of the computing node, a next hop index that identifies an associated next hop entry of the local next hop table of the computing node, and a next hop type that indicates whether the network packets associated with the network flow are to be processed locally by the computing node or remotely by another computing node of the cluster computing device.

Example 25 includes the subject matter of any of Examples 23 and 24, and wherein the network flow information received from the network controller includes the flow tuple and the flow identifier.

Example 26 includes the subject matter of any of Examples 23-25, and further including means for configuring the next hop type of the network flow entry added to the local flow table to indicate that the network packets associated with the network flow are to be processed locally by the computing node; and means for configuring the next hop index of the network flow entry added to the local flow table with a null value.

Example 27 includes the subject matter of any of Examples 23-26, and further including means for determining a local internet protocol address associated with an interface of the computing node communicatively coupled to one or more other computing nodes of the cluster computing device; and wherein the internet protocol address associated with the computing node includes the local internet protocol address associated with the interface of the computing node.

Example 28 includes the subject matter of any of Examples 23-27, and wherein each network flow entry of the local flow table of the computing node includes a flow tuple that indicates a source and a destination of network packets associated with a network flow, a flow identifier that uniquely identifies the network flow entry from each other network flow entry of the plurality of network flow entries stored in the local flow table of the computing node, a next hop index that identifies a next hop entry of a plurality of next hop entries stored in the local next hop table of the computing node associated with the network flow entry, and a next hop type that indicates whether the network packets associated with the network flow are to be processed locally by the computing node or remotely by another computing node of the cluster computing device.

Example 29 includes the subject matter of any of Examples 23-28, and further including means for receiving a network packet from a remote computing device; means for determining a 5-tuple of the received network packet; means for performing a flow lookup operation on the local flow table of the computing node to determine a network flow entry of the plurality of network flow entries that includes the flow tuple that matches the 5-tuple of the received network packet; means for determining whether the next hop type associated with the determined network flow entry indicates that the network packets associated with the network flow are to be processed locally by the computing node or remotely by another computing node of the cluster computing device; means for processing the network packet in response to a determination that the next hop type associated with the determined network flow entry indicates that the network packets associated with the network flow are to be processed locally by the computing node; and means for forwarding the received network packet to a next hop computing node of the cluster computing device in response to a determination that the next hop type associated with the determined network flow entry indicates that the network packets associated with the network flow are to be processed remotely by another computing node of the cluster computing device.

Example 30 includes the subject matter of any of Examples 23-29, and further including means for determining the next hop computing node of the cluster computing device to process the received network packet.

Example 31 includes the subject matter of any of Examples 23-30, and further including means for performing a next hop lookup operation on the local next hop table of the computing node as a function of the next hop index associated with the determined network flow to determine a matching next hop entry of the plurality of next hop entries; and wherein the means for determining the next hop computing node includes means for determining the next hop computing node of the cluster computing device to process the received network packet as a function of the matching next hop entry.

Example 32 includes the subject matter of any of Examples 23-31, and further including means for determining a media access control address of the next hop computing node based on the matching next hop entry of the local next hop table of the computing node; means for substituting a destination media access control address of the received network packet with the determined media access control address of the next hop computing node; and wherein the means for forwarding the received network packet to the next hop computing node includes means for forwarding the received network packet to the next hop computing node based on the substituted destination media access control address of the received network packet.

Example 33 includes a computing node of a cluster computing device to bridge between coarse-grained and fine-grained load balancing, the computing node including a flow management module to (i) receive a multicast network packet from a different computing node of the cluster computing device, wherein the multicast network packet includes network flow information and next hop information indicative of the different computing node, (ii) add a network flow entry to a local flow table of the computing node based on the network flow information from the multicast network packet received from the different computing node, and (iii) add a next hop entry to a local next hop table of the computing node based on the next hop information from the multicast network packet received from the different computing node, wherein the next hop entry added to the local next hop table of the computing node is associated with the network flow entry added to the local flow table of the computing node.

Example 34 includes the subject matter of Example 33, and wherein the local next hop table of the computing node includes a plurality of next hop entries, each next hop entry of the plurality of next hop entries is associated with a different network flow entry of a plurality of network flow entries of the local network flow table; wherein the next hop information of the multicast network packet received from the different computing node includes an internet protocol address associated with the different computing node; and wherein the next hop entry added to the local next hop table of the computing node includes the internet protocol address associated with the different computing node, a next hop index that uniquely identifies the added next hop entry from each other next hop entry of the plurality of next hop entries stored in the local next hop table of the computing node, and a media access control address corresponding to the internet protocol address associated with the different computing node.

Example 35 includes the subject matter of any of Examples 33 and 34, and wherein the flow management module is further to (i) determine the media access control address corresponding to the internet protocol address associated with the different computing node and (ii) configure the media access control address of the next hop entry added to the local next hop table with the determined media access control address.

Example 36 includes the subject matter of any of Examples 33-35, and wherein the network flow entry added to the local flow table of the computing node includes a flow tuple that indicates a source and a destination of network packets associated with a network flow, a flow identifier that uniquely identifies the added network flow entry from each other network flow entry of the plurality of network flow entries stored in the local flow table of the computing node, the next hop index that uniquely identifies the next hop entry of the plurality of next hop entries of the local next hop table associated with the network flow entry added to the local flow table of the computing node, and a next hop type that indicates whether the network packets associated with the network flow are to be processed locally by the computing node or remotely by another computing node of the cluster computing device.

Example 37 includes the subject matter of any of Examples 33-36, and wherein the network flow information of the multicast network packet received from the different computing node includes the flow tuple and the flow identifier.

Example 38 includes the subject matter of any of Examples 33-37, and wherein the flow management module is further to configure the next hop type of the network flow entry added to the local flow table to indicate that the network packets associated with the network flow are to be processed remotely by another computing node of the cluster computing device in response to receiving the multicast network packet from the different computing node.

Example 39 includes the subject matter of any of Examples 33-38, and wherein the local network flow table includes a plurality of network flow entries, each network flow entry of the local flow table of the computing node includes a flow tuple that indicates a source and a destination of network packets associated with a network flow, a flow identifier that uniquely identifies the network flow entry from each other network flow entry of the plurality of network flow entries stored in the local flow table of the computing node, a next hop index that uniquely identifies a next hop entry of a plurality of next hop entries of the local next hop table associated with the network flow entry, and a next hop type that indicates whether the network packets associated with the network flow are to be processed locally by the computing node or remotely by another computing node of the cluster computing device.

Example 40 includes the subject matter of any of Examples 33-39, and further including a flow control module to (i) receive a network packet from a remote computing device, (ii) determine a 5-tuple of the received network packet, (iii) perform a flow lookup operation on the local flow table of the computing node to determine a network flow entry of the plurality of network flow entries that includes the flow tuple that matches the 5-tuple of the received network packet, (iv) determine whether the next hop type associated with the determined network flow entry indicates that the network packets associated with the network flow are to be processed locally by the computing node or remotely by another computing node of the cluster computing device, (v) process the network packet in response to a determination that the next hop type associated with the determined network flow entry indicates that the network packets associated with the network flow are to be processed locally by the computing node, and (vi) forward the received network packet to a next hop computing node of the cluster computing device in response to a determination that the next hop type associated with the determined network flow entry indicates that the network packets associated with the network flow are to be processed remotely by another computing node of the cluster computing device.

Example 41 includes the subject matter of any of Examples 33-40, and wherein the flow control module is further to determine the next hop computing node of the cluster computing device to process the received network packet.

Example 42 includes the subject matter of any of Examples 33-41, and wherein the flow control module is further to perform a next hop lookup operation on the local next hop table of the computing node as a function of the next hop index associated with the determined network flow entry to determine a matching next hop entry of the plurality of next hop entries; and wherein to determine the next hop computing node includes to determine the next hop computing node of the cluster computing device to process the received network packet as a function of the matching next hop entry.

Example 43 includes the subject matter of any of Examples 33-42, and wherein to determine the next hop computing node includes to determine that the different computing node is the next hop computing node based on matching the next hop entry added to the local next hop table.

Example 44 includes a method for bridging between coarse-grained and fine-grained load balancing, the method including receiving, by a first computing node of a cluster computing device, a multicast network packet from a second computing node of the cluster computing device, wherein the multicast network packet includes network flow information and next hop information indicative of the second computing node; adding, by the first computing node, a network flow entry to a local flow table of the first computing node based on the network flow information from the multicast network packet received from the second computing node; and adding, by the first computing node, a next hop entry to a local next hop table of the first computing node based on the next hop information from the multicast network packet received from the second computing node, wherein the next hop entry added to the local next hop table of the first computing node is associated with the network flow entry added to the local flow table of the first computing node.

Example 45 includes the subject matter of Example 44, and wherein the local next hop table of the first computing node includes a plurality of next hop entries, each next hop entry of the plurality of next hop entries is associated with a different network flow entry of a plurality of network flow entries of the local network flow table; wherein the next hop information of the multicast network packet received from the second computing node includes an internet protocol address associated with the second computing node; and wherein the next hop entry added to the local next hop table of the first computing node includes the internet protocol address associated with the second computing node, a next hop index that uniquely identifies the added next hop entry from each other next hop entry of the plurality of next hop entries stored in the local next hop table of the first computing node, and a media access control address corresponding to the internet protocol address associated with the second computing node.

Example 46 includes the subject matter of Examples 44 and 45, and further including determining, by the first computing node, the media access control address corresponding to the internet protocol address associated with the second computing node; and configuring, by the first computing node, the media access control address of the next hop entry added to the local next hop table with the determined media access control address.

Example 47 includes the subject matter of any of Examples 44-46, and wherein the network flow entry added to the local flow table of the first computing node includes a flow tuple that indicates a source and a destination of network packets associated with a network flow, a flow identifier that uniquely identifies the added network flow entry from each other network flow entry of the plurality of network flow entries stored in the local flow table of the first computing node, the next hop index that uniquely identifies the next hop entry of the plurality of next hop entries of the local next hop table associated with the network flow entry added to the local flow table of the first computing node, and a next hop type that indicates whether the network packets associated with the network flow are to be processed locally by the first computing node or remotely by another computing node of the cluster computing device.

Example 48 includes the subject matter of any of Examples 44-47, and wherein the network flow information of the multicast network packet received from the second computing node includes the flow tuple and the flow identifier.

Example 49 includes the subject matter of any of Examples 44-48, and further including configuring, by the first computing node, the next hop type of the network flow entry added to the local flow table to indicate that the network packets associated with the network flow are to be processed remotely by another computing node of the cluster computing device in response to receiving the multicast network packet from the second computing node.

Example 50 includes the subject matter of any of Examples 44-49, and wherein the local network flow table includes a plurality of network flow entries, each network flow entry of the local flow table of the first computing node includes a flow tuple that indicates a source and a destination of network packets associated with a network flow, a flow identifier that uniquely identifies the network flow entry from each other network flow entry of the plurality of network flow entries stored in the local flow table of the first computing node, a next hop index that uniquely identifies a next hop entry of a plurality of next hop entries of the local next hop table associated with the network flow entry, and a next hop type that indicates whether the network packets associated with the network flow are to be processed locally by the first computing node or remotely by another computing node of the cluster computing device.

Example 51 includes the subject matter of any of Examples 44-50, and further including receiving, by the first computing node, a network packet from a remote computing device; determining, by the first computing node, a 5-tuple of the received network packet; performing, by the first computing node, a flow lookup operation on the local flow table of the first computing node to determine a network flow entry of the plurality of network flow entries that includes the flow tuple that matches the 5-tuple of the received network packet; determining, by the first computing node, whether the next hop type associated with the determined network flow entry indicates that the network packets associated with the network flow are to be processed locally by the first computing node or remotely by another computing node of the cluster computing device; processing, by the first computing node, the network packet in response to a determination that the next hop type associated with the determined network flow entry indicates that the network packets associated with the network flow are to be processed locally by the computing node; and forwarding, by the first computing node, the received network packet to a next hop computing node of the cluster computing device in response to a determination that the next hop type associated with the determined network flow entry indicates that the network packets associated with the network flow are to be processed remotely by another computing node of the cluster computing device.

Example 52 includes the subject matter of any of Examples 44-51, and further including determining, by the first computing node, the next hop computing node of the cluster computing device to process the received network packet.

Example 53 includes the subject matter of any of Examples 44-52, and further including performing, by the first computing node, a next hop lookup operation on the local next hop table of the first computing node as a function of the next hop index associated with the determined network flow entry to determine a matching next hop entry of the plurality of next hop entries; and wherein determining the next hop computing node includes determining the next hop computing node of the cluster computing device to process the received network packet as a function of the matching next hop entry.

Example 54 includes the subject matter of any of Examples 44-53, and wherein determining the next hop computing node includes determining that the second computing node is the next hop computing node based on matching the next hop entry added to the local next hop table.

Example 55 includes a computing node of a cluster computing device to bridge between coarse-grained and fine-grained load balancing, the computing node including a processor; and a memory having stored therein a plurality of instructions that when executed by the processor cause the computing node to perform the method of any of Examples 44-54.

Example 56 includes one or more machine-readable media having a plurality of instructions stored thereon that in response to being executed result in computing node of a cluster computing device performing the method of any of Examples 44-54.

Example 57 includes a computing node of a cluster computing device to bridge between coarse-grained and fine-grained load balancing, the computing node including means for receiving a multicast network packet from a different computing node of the cluster computing device, wherein the multicast network packet includes network flow information and next hop information indicative of the different computing node; means for adding a network flow entry to a local flow table of the computing node based on the network flow information from the multicast packet received from the different computing node; and means for adding a next hop entry to a local next hop table of the computing node based on the next hop information from the multicast packet received from the different computing node, wherein the next hop entry added to the local next hop table of the computing node is associated with the network flow entry added to the local flow table of the computing node.

Example 58 includes the subject matter of Example 57, and wherein the local next hop table of the computing node includes a plurality of next hop entries, each next hop entry of the plurality of next hop entries is associated with a different network flow entry of a plurality of network flow entries of the local network flow table; wherein the next hop information of the multicast network packet received from the different computing node includes an internet protocol address associated with the different computing node; and wherein the next hop entry added to the local next hop table of the computing node includes the internet protocol address associated with the different computing node, a next hop index that uniquely identifies the added next hop entry from each other next hop entry of the plurality of next hop entries stored in the local next hop table of the computing node, and a media access control address corresponding to the internet protocol address associated with the different computing node.

Example 59 includes the subject matter of any of Examples 57 and 58, and further including means for determining the media access control address corresponding to the internet protocol address associated with the different computing node; and means for configuring the media access control address of the next hop entry added to the local next hop table with the determined media access control address.

Example 60 includes the subject matter of any of Examples 57-59, and wherein the network flow entry added to the local flow table of the computing node includes a flow tuple that indicates a source and a destination of network packets associated with a network flow, a flow identifier that uniquely identifies the added network flow entry from each other network flow entry of the plurality of network flow entries stored in the local flow table of the computing node, the next hop index that uniquely identifies the next hop entry of the plurality of next hop entries of the local next hop table associated with the network flow entry added to the local flow table of the computing node, and a next hop type that indicates whether the network packets associated with the network flow are to be processed locally by the computing node or remotely by another computing node of the cluster computing device.

Example 61 includes the subject matter of any of Examples 57-60, and wherein the network flow information received from the multicast packet received from the different computing node includes the flow tuple and the flow identifier.

Example 62 includes the subject matter of any of Examples 57-61, and further including means for configuring the next hop type of the network flow entry added to the local flow table to indicate that the network packets associated with the network flow are to be processed remotely by another computing node of the cluster computing device in response to receiving the multicast network packet from the different computing node.

Example 63 includes the subject matter of any of Examples 57-62, and wherein the local network flow table includes a plurality of network flow entries, each network flow entry of the local flow table of the computing node includes a flow tuple to indicate a source and a destination of network packets associated with a network flow, a flow identifier to uniquely identify the network flow entry from each other network flow entry of the plurality of network flow entries stored in the local flow table of the computing node, a next hop index that uniquely identifies a next hop entry of a plurality of next hop entries of the local next hop table associated with the network flow entry, and a next hop type to indicate whether the network packets associated with the network flow are to be processed locally by the computing node or remotely by another computing node of the cluster computing device.

Example 64 includes the subject matter of any of Examples 57-63, and further including means for receiving a network packet from a remote computing device; means for determining a 5-tuple of the received network packet; means for performing a flow lookup operation on the local flow table of the computing node to determine a network flow entry of the plurality of network flow entries that includes the flow tuple that matches the 5-tuple of the received network packet; means for determining whether the next hop type associated with the determined network flow entry indicates that the network packets associated with the network flow are to be processed locally by the computing node or remotely by another computing node of the cluster computing device; means for processing the network packet in response to a determination that the next hop type associated with the determined network flow entry indicates that the network packets associated with the network flow are to be processed locally by the computing node; and means for forwarding the received network packet to a next hop computing node of the cluster computing device in response to a determination that the next hop entry associated with the determined network flow entry indicates that the network packets associated with the network flow are to be processed remotely by another computing node of the cluster computing device.

Example 65 includes the subject matter of any of Examples 57-64, and further including means for determining the next hop computing node of the cluster computing device to process the received network packet.

Example 66 includes the subject matter of any of Examples 57-65, and further including means for performing a next hop lookup operation on the local next hop table of the computing node as a function of the next hop index associated with the determined network flow entry to determine a matching next hop entry of the plurality of next hop entries; and wherein the means for determining the next hop computing node includes means for determining the next hop computing node of the cluster computing device to process the received network packet as a function of the matching next hop entry.

Example 67 includes the subject matter of any of Examples 57-66, and wherein the means for determining the next hop computing node includes means for determining that the different computing node is the next hop computing node based on matching the next hop entry added to the local next hop table.

The invention claimed is:

1. A computing node of a cluster computing device to bridge between coarse-grained and fine-grained load balancing, the computing node comprising:
   a processor; and
   a memory coupled to the processor having (i) a local flow table to store a plurality of network flow entries (ii) a local next hop table to store forwarding information for one or more of the plurality of network flow entries and (iii) stored therein a plurality of instructions that when executed by the processor cause the computing node to:
   (i) receive network flow information from a network controller (ii) add a network flow entry to the local flow table based on the network flow information received from the network controller, (iii) generate a multicast network packet comprising the network flow information received from the network controller and an internet protocol address associated with the computing node, and (iv) transmit the multicast network packet to each other computing node of the cluster computing device to facilitate the addition of a different network flow entry to a local flow table of each other computing node and a next hop entry to a local next hop table of each other computing node based on the multicast network packet.

2. The computing node of claim 1, wherein the network flow entry added to the local flow table of the computing node comprises a flow tuple that indicates a source and a destination of network packets associated with a network flow, a flow identifier that uniquely identifies the added network flow entry from each other network flow entry of the plurality of network flow entries stored in the local flow table of the computing node, a next hop index that identifies an associated next hop entry of the local next hop table of the computing node, and a next hop type that indicates whether the network packets associated with the network flow are to be processed locally by the computing node or remotely by another computing node of the cluster computing device.

3. The computing node of claim 2, wherein the flow management module is further to (i) configure the next hop type of the network flow entry added to the local flow table to indicate that the network packets associated with the network flow are to be processed locally by the computing node and (ii) configure the next hop index of the network flow entry added to the local flow table with a null value.

4. The computing node of claim 2, wherein the flow management module is further to determine a local internet protocol address associated with an interface of the computing node communicatively coupled to one or more other computing nodes of the cluster computing device; and wherein the internet protocol address associated with the computing node comprises the local internet protocol address associated with the interface of the computing node.

5. The computing node of claim 1, wherein each network flow entry of the local flow table of the computing node comprises a flow tuple that indicates a source and a destination of network packets associated with a network flow, a flow identifier that uniquely identifies the network flow entry from each other network flow entry of the plurality of network flow entries stored in the local flow table of the computing node, a next hop index that identifies a next hop entry of a plurality of next hop entries stored in the local next hop table of the computing node associated with the network flow entry, and a next hop type that indicates whether the network packets associated with the network flow are to be processed locally by the computing node or remotely by another computing node of the cluster computing device.

6. The computing node of claim 5, further comprising a flow control module to (i) receive a network packet from a remote computing device, (ii) determine a 5-tuple of the received network packet, (iii) perform a flow lookup operation on the local flow table of the computing node to determine a network flow entry of the plurality of network flow entries that comprises the flow tuple that matches the 5-tuple of the received network packet, (iv) determine whether the next hop type associated with the determined network flow entry indicates that the network packets associated with the network flow are to be processed locally by the computing node or remotely by another computing node of the cluster computing device, (v) process the network packet in response to a determination that the next hop type associated with the determined network flow entry indicates that the network packets associated with the network flow are to be processed locally by the computing node, and (vi) forward the received network packet to a next hop computing node of the cluster computing device in response to a determination that the next hop type associated with the determined network flow entry indicates that the network packets associated with the network flow are to be processed remotely by another computing node of the cluster computing device.

7. The computing node of claim 6, wherein the flow control module is further to determine the next hop computing node of the cluster computing device to process the received network packet.

8. The computing node of claim 7, wherein the flow control module is further to perform a next hop lookup operation on the local next hop table of the computing node as a function of the next hop index associated with the determined network flow entry to determine a matching next hop entry of the plurality of next hop entries; and wherein to determine the next hop computing node comprises to determine the next hop computing node of the cluster computing device to process the received network packet as a function of the matching next hop entry.

9. The computing node of claim 8, wherein the flow control module is further to (i) determine a media access control address of the next hop computing node based on the matching next hop entry of the local next hop table of the computing node and (ii) substitute a destination media access control address of the received network packet with the determined media access control address of the next hop computing node; and wherein to forward the received network packet to the next hop computing node comprises to forward the received network packet to the next hop computing node based on the substituted destination media access control address of the received network packet.

10. One or more non-transitory machine-readable media comprising a plurality of instructions stored thereon that in response to being executed by a processor cause a computing node of a cluster computing device to:

store a plurality of network flow entries in a local flow table of the computing node;

store forwarding information for one or more of the plurality of network flow entries in a local next hop table of the computing node;

receive network flow information from a network controller;

add a network flow entry to the local flow table of the computing node based on the network flow information received from the network controller;

generate a multicast network packet comprising the network flow information received from the network controller and an internet protocol address associated with the computing node; and transmit the multicast network packet to each other computing node of the cluster computing device to facilitate the addition of a different network flow entry to a local flow table of each other computing node and a next hop entry to a local next hop table of each other computing node based on the multicast network packet.

11. The one or more non-transitory machine-readable media of claim 10, wherein the network flow entry added to the local flow table of the computing node comprises a flow tuple that indicates a source and a destination of network packets associated with a network flow, a flow identifier that uniquely identifies the added network flow entry from each other network flow entry of the plurality of network flow entries stored in the local flow table of the computing node, a next hop index that identifies an associated next hop entry of the local next hop table of the computing node, and a next hop type that indicates whether the network packets associated with the network flow are to be processed locally by the computing node or remotely by another computing node of the cluster computing device.

12. The one or more non-transitory machine-readable media of claim 11, wherein the plurality of instructions further cause the computing node of the cluster computing device to:

configure the next hop type of the network flow entry added to the local flow table to indicate that the network packets associated with the network flow are to be processed locally by the computing node; and configure the next hop index of the network flow entry added to the local flow table with a null value.

13. The one or more non-transitory machine-readable media of claim 11, wherein the plurality of instructions further cause the computing node of the cluster computing device to determine a local internet protocol address associated with an interface of the computing node communicatively coupled to one or more other computing nodes of the cluster computing device; and wherein the internet protocol address associated with the computing node comprises the local internet protocol address associated with the interface of the computing node.

14. The one or more non-transitory machine-readable media of claim 10, wherein each network flow entry of the local flow table of the computing node comprises a flow tuple that indicates a source and a destination of network packets associated with a network flow, a flow identifier that uniquely identifies the network flow entry from each other network flow entry of the plurality of network flow entries stored in the local flow table of the computing node, a next hop index that identifies a next hop entry of a plurality of next hop entries stored in the local next hop table of the computing node associated with the network flow entry, and a next hop type that indicates whether the network packets associated with the network flow are to be processed locally by the computing node or remotely by another computing node of the cluster computing device.

15. The one or more non-transitory machine-readable media of claim 14, wherein the plurality of instructions further cause the computing node of the cluster computing device to:
receive a network packet from a remote computing device;
determine a 5-tuple of the received network packet;
perform a flow lookup operation on the local flow table of the computing node to determine a network flow entry of the plurality of network flow entries that comprises the flow tuple that matches the 5-tuple of the received network packet;
determine whether the next hop type associated with the determined network flow entry indicates that the network packets associated with the network flow are to be processed locally by the computing node or remotely by another computing node of the cluster computing device;
process the network packet in response to a determination that the next hop type associated with the determined network flow entry indicates that the network packets associated with the network flow are to be processed locally by the computing node; and
forward the received network packet to a next hop computing node of the cluster computing device in response to a determination that the next hop type associated with the determined network flow entry indicates that the network packets associated with the network flow are to be processed remotely by another computing node of the cluster computing device.

16. The one or more non-transitory machine-readable media of claim 15, wherein the plurality of instructions further cause the computing node of the cluster computing device to determine the next hop computing node of the cluster computing device to process the received network packet.

17. The one or more non-transitory machine-readable media of claim 16, wherein the plurality of instructions further cause the computing node of the cluster computing device to perform a next hop lookup operation on the local next hop table of the computing node as a function of the next hop index associated with the determined network flow entry to determine a matching next hop entry of the plurality of next hop entries; and
wherein to determine the next hop computing node comprises to determine the next hop computing node of the cluster computing device to process the received network packet as a function of the matching next hop entry.

18. The one or more non-transitory machine-readable media of claim 17, wherein the plurality of instructions further cause the computing node of the cluster computing device to:
determine a media access control address of the next hop computing node based on the matching next hop entry of the local next hop table of the computing node;
substitute a destination media access control address of the received network packet with the determined media access control address of the next hop computing node; and
wherein to forward the received network packet to the next hop computing node comprises to forward the received network packet to the next hop computing node based on the substituted destination media access control address of the received network packet.

19. A method for bridging between coarse-grained and fine-grained load balancing, the method comprising:
storing, by a computing node of a cluster computing device, a plurality of network flow entries in a local flow table of the computing node;
storing, by the computing node, forwarding information for one or more of the plurality of network flow entries in a local next hop table of the computing node;
receiving, by the computing node, network flow information from a network controller;
adding, by the computing node, a network flow entry to the local flow table of the computing node based on the network flow information received from the network controller;
generating, by the computing node, a multicast network packet comprising the network flow information received from the network controller and an internet protocol address associated with the computing node; and
transmitting, by the computing node, the multicast network packet to each other computing node of the cluster computing device to facilitate the addition of a different network flow entry to a local flow table of each other computing node and a next hop entry to a local next hop table of each other computing node based on the multicast network packet.

20. The method of claim 19, wherein the network flow entry added to the local flow table of the computing node comprises a flow tuple that indicates a source and a destination of network packets associated with a network flow, a flow identifier that uniquely identifies the added network flow entry from each other network flow entry of the plurality of network flow entries stored in the local flow table of the computing node, a next hop index that identifies an associated next hop entry of the local next hop table of the computing node, and a next hop type that indicates whether the network packets associated with the network flow are to be processed locally by the computing node or remotely by another computing node of the cluster computing device.

21. The method of claim 20, further comprising:
configuring, by the computing node, the next hop type of the network flow entry added to the local flow table to indicate that the network packets associated with the network flow are to be processed locally by the computing node; and
configuring, by the computing node, the next hop index of the network flow entry added to the local flow table with a null value.

22. The method of claim 19, wherein each network flow entry of the local flow table of the computing node comprises a flow tuple that indicates a source and a destination of network packets associated with a network flow, a flow identifier that uniquely identifies the network flow entry from each other network flow entry of the plurality of network flow entries stored in the local flow table of the computing node, a next hop index that identifies a next hop entry of a plurality of next hop entries stored in the local next hop table of the computing node associated with the network flow entry, and a next hop type that indicates whether the network packets associated with the network flow are to be processed locally by the computing node or remotely by another computing node of the cluster computing device.

23. The method of claim 22, further comprising:
receiving, by the computing node, a network packet from a remote computing device;
determining, by the computing node, a 5-tuple of the received network packet;
performing, by the computing node, a flow lookup operation on the local flow table of the computing node to determine a network flow entry of the plurality of network flow entries that comprises the flow tuple that matches the 5-tuple of the received network packet;
determining, by the computing node, whether the next hop type associated with the determined network flow entry indicates that the network packets associated with the network flow are to be processed locally by the computing node or remotely by another computing node of the cluster computing device;
processing, by the computing node, the network packet in response to a determination that the next hop type associated with the determined network flow entry indicates that the network packets associated with the network flow are to be processed locally by the computing node; and
forwarding, by the computing node, the received network packet to a next hop computing node of the cluster computing device in response to a determination that the next hop type associated with the determined network flow entry indicates that the network packets associated with the network flow are to be processed remotely by another computing node of the cluster computing device.

24. The method of claim 23, further comprising:
performing, by the computing node, a next hop lookup operation on the local next hop table of the computing node as a function of the next hop index associated with the determined network flow entry to determine a matching next hop entry of the plurality of next hop entries; and
determining, by the computing node, the next hop computing node of the cluster computing device to process the received network packet as a function of the matching next hop entry.

25. The method of claim 24, further comprising:
determining, by the computing node, a media access control address of the next hop computing node based on the matching next hop entry of the local next hop table of the computing node;
substituting, by the computing node, a destination media access control address of the received network packet with the determined media access control address of the next hop computing node; and
wherein forwarding the received network packet to the next hop computing node comprises forwarding the received network packet to the next hop computing node based on the substituted destination media access control address of the received network packet.

* * * * *